United States Patent
Naito et al.

(10) Patent No.: US 9,506,169 B2
(45) Date of Patent: Nov. 29, 2016

(54) CARBON FIBER BUNDLE AND MANUFACTURING METHOD OF THE SAME

(71) Applicant: Teijin Limited, Osaka-shi, Osaka (JP)

(72) Inventors: Takeshi Naito, Matsuyama (JP); Tsubasa Ono, Matsuyama (JP); Hiroshi Sakurai, Matsuyama (JP)

(73) Assignee: Teijin Limited, Osaka-Shi, Osaka (JP)

( * ) Notice: Subject to any disclaimer, the term of this patent is extended or adjusted under 35 U.S.C. 154(b) by 158 days.

(21) Appl. No.: 14/383,949

(22) PCT Filed: Mar. 8, 2013

(86) PCT No.: PCT/JP2013/056499
§ 371 (c)(1),
(2) Date: Sep. 9, 2014

(87) PCT Pub. No.: WO2013/133421
PCT Pub. Date: Sep. 12, 2013

(65) Prior Publication Data
US 2015/0025191 A1 Jan. 22, 2015

(30) Foreign Application Priority Data

Mar. 9, 2012 (JP) .................................. 2012-052912

(51) Int. Cl.
*D01F 11/14* (2006.01)
*D06M 15/59* (2006.01)
(Continued)

(52) U.S. Cl.
CPC . *D01F 9/14* (2013.01); *C08K 7/06* (2013.01); *C09D 177/06* (2013.01); *D01F 11/14* (2013.01);
(Continued)

(58) Field of Classification Search
CPC .............................. D01F 11/14; C08G 69/36
See application file for complete search history.

(56) References Cited

U.S. PATENT DOCUMENTS 6,248,262 B1 * 6/2001 Kubotera ................ H01B 1/24
106/472
6,251,206 B1 * 6/2001 Saito .................... B29B 15/122
118/124

(Continued)

FOREIGN PATENT DOCUMENTS

EP        0289142 A2 * 11/1988    .............. C08K 5/00
JP      H07-197381 A     8/1995

(Continued)

OTHER PUBLICATIONS

Zhang, R. L.; Huang, Y.D.; Liu, L.; Tang, Y. R.; Su, D.; Xu, L. W. Effect of the molecular weight of sizing agent on the surface of carbon fibres and interface of its composites. Applied Surface Science, 2011, 257, 1840-1844. Available online Sep. 17, 2010.*

(Continued)

*Primary Examiner* — Robert C Boyle
*Assistant Examiner* — Stephen Rieth
(74) *Attorney, Agent, or Firm* — Banner & Witcoff, Ltd.

(57) ABSTRACT

The present invention relates to a carbon fiber bundle excellent in terms of adhesion to matrix resins and process handleability and less apt to suffer the shedding of the sizing agent in processing steps, the carbon fiber bundle being a carbon fiber bundle having a sizing agent adherent to the surface thereof, characterized in that the carbon fiber bundle includes a plurality of carbon fibers and the sizing agent includes a copolyamide resin, the copolyamide resin having both a specific polyamide component and nylon-6 and/or nylon-66 as repeating units and having a melting point of 180° C. or lower, the copolyamide resin preferably having a melting of 60 to 160°, or a glass transition temperature of −20 to 50° C.

16 Claims, 2 Drawing Sheets

(51) Int. Cl.

| | | |
|---|---|---|
| *D01F 9/14* | (2006.01) | |
| *D04H 3/002* | (2012.01) | |
| *D04H 3/04* | (2012.01) | |
| *C08K 7/06* | (2006.01) | |
| *C09D 177/06* | (2006.01) | |
| *D06M 101/40* | (2006.01) | |

(52) U.S. Cl.
CPC ............... *D04H 3/002* (2013.01); *D04H 3/04* (2013.01); *D06M 15/59* (2013.01); *D06M 2101/40* (2013.01); *D10B 2101/12* (2013.01); *Y10T 428/2918* (2015.01)

(56) References Cited

U.S. PATENT DOCUMENTS

2001/0023937 A1  9/2001  Patel
2003/0107148 A1* 6/2003  Davis ...................... D04H 1/42
                                              264/112

FOREIGN PATENT DOCUMENTS

| JP | H07-299875 A | 11/1995 |
|---|---|---|
| JP | H09-003777 A | 1/1997 |
| JP | 2003-105676 A | 4/2003 |
| JP | 2003-268674 A | 9/2003 |
| JP | 2006-124847 | 5/2006 |
| JP | 2006-188782 A | 7/2006 |
| JP | 2012-041658 A | 3/2012 |

OTHER PUBLICATIONS

Partial written translation of JPH07-299875A. Nov. 14, 1995.*
Machine Translation of JPH07-299875A. Nov. 14, 1995.*
Elvamide nylon multipolymer resins. DuPont. Aug. 1995.*
Cascio, A. Development of next generation carpet backings for facile recyclability. Thesis. Georgia Institute of Technology. Aug. 2006.*
Feb. 27, 2015—(EP) Supplementary Search Report—App 13758064.
May 14, 2013—International Search Report—Int'l App PCT/JP2013/056499.

* cited by examiner

CARBON FIBER BUNDLE AND MANUFACTURING METHOD OF THE SAME

CROSS REFERENCE TO RELATED APPLICATIONS

This is a U.S. National Phase Application under 35 U.S.C. §371 of International Application No. PCT/JP2013/056499, filed Mar. 8, 2013 and published Under PCT Article 21(2), which claims priority to Japanese Application Nos. 2012-052912 and 2012-278056, filed Mar. 9, 2012 and Dec. 20, 2012, respectively, the entire contents of each of which are incorporated herein by reference.

TECHNICAL FIELD

The present invention relates to a carbon fiber bundle, more particularly, a carbon fiber bundle for reinforcing composite materials, and to a manufacturing method of the carbon fiber bundle and a composite obtained from the carbon fiber bundle.

BACKGROUND ART

Carbon fibers are one of materials which are used in various applications as composite materials together with resins because the carbon fibers enhance the strength of the resins and, simultaneously therewith, the resins protect the carbon fibers from brittle fracture. However, the carbon fibers have had a problem in that since the carbon fibers, which are usually used in a form of fiber bundles constituted by a large number of filaments, have a low elongation, fluffing and filament fiber breakages tends to be occurred due to mechanical friction or the like especially during processing. Hence, a technique generally employed in using carbon fibers is to apply a sizing agent to the surface of the carbon fibers in order to improve the handleability of the carbon fiber bundles when using the carbon fibers. The use of a sizing agent is for enhancing bundling properties to improve handleability or for reducing the occurrence of fluffing or fiber breakages in the carbon fibers and simultaneously enhancing adhesion between the carbon fibers and resins to maximize the reinforcing effect of the carbon fibers.

For example, patent document 1 discloses a method in which in the case where a conventional epoxy resin is used as a matrix resin, a sizing agent based on an epoxy resin is used in order to improve interfacial bonding strength. Patent document 2 discloses a mehtod in which in the case of using polypropylene, which is a thermoplastic resin, as a matrix resin, a sizing agent based on an acid-modified polyolefin is applied.

However, use of the conventional sizing agents have had a problem in that even if the epoxy-based sizing agent or the thermoplastic-resin-based sizing agent is used, a texture of the carbon fiber bundles tend to be hardened although an improvement in interfacial bonding strength is brought about, and handleability and processability are considerably reduced. As a result, composites finally obtained have insufficient properties. Namely, the conventional sizing agents are insufficient in processability especially for cutting or opening, although effective in improving interfacial bonding strength. Furthermore, the epoxy-based sizing agent, which is in use most extensively, has had a problem in that although this sizing agent may be satisfactory in the case where the matrix resin to be reinforced by the carbon fiber bundles is a thermosetting resin, high bonding strength cannot be obtained in the case of using thermoplastic resins because such resins generally have poor compatibility with the sizing agent.

Meanwhile, patent document 3 discloses a technique in which a water-soluble polyamide resin is adhered to carbon fibers. This technique, however, is disadvantageous in that since the polyamide resin is water-soluble, the sized carbon fiber bundles inevitably have high hygroscopicity and are unusable in applications where the fiber bundles as such are passed through long steps. Namely, there has been a serious drawback that the sized carbon fiber bundles are usable in a limited form, i.e., the sized carbon fiber bundles are chopped, immediately impregnated with a resin, and formed into resin pellets, which are easy to dry.

Furthermore, in these conventional methods, there has been a problem in that the carbon fibers have too high bundling properties especially in fields where carbon fiber bundles in a tape form are opened and used. The individual single fibers in the carbon fiber bundles are not evenly dispersed in a composite material, resulting in an insufficient reinforcing effect. This problem has been serious especially in the case where carbon fiber bundles in a tape form are opened, separated, and cut, and the cut carbon fibers are randomly applied and impregnated with a resin, as in the case of random mats.

There has been a desire for a development in a surface treatment method of a carbon fiber bundle suitable for carbon-fiber composite materials, in particular, for random mats in which fiber bundles which are widened and opened are used.

CITATION LIST

Patent Documents

Patent Document 1: JP-A-7-197381
Patent Document 2: JP-A-2006-124847
Patent Document 3: JP-A-2003-105676

SUMMARY OF THE INVENTION

Problems that the Invention is to Solve

An object of the invention is to provide a carbon fiber bundle which is excellent in terms of adhesion to matrix resins and handleability and to provide carbon fiber products obtained therefrom. Another object of the invention is to provide a carbon fiber bundle which is less apt to suffer shedding of the sizing agent therefrom in processing steps and carbon fiber products obtained including the carbon fiber bundle.

Means for Solving the Problems

The carbon fiber bundle of the invention is a carbon fiber bundle having a sizing agent adherent to the surface thereof, characterized in that the carbon fiber bundle includes a plurality of carbon fibers, the sizing agent includes a copolyamide resin, the copolyamide resin containing the following repeating unit (A) and at least one of the following repeating unit (B) and repeating unit (C), and the copolyamide resin has a melting point of 180° C. or lower.

—[NH(CH$_2$)$_m$CO]— (m is an integer of 6 to 20.)     (A)

—[NH(CH$_2$)$_6$NHCO(CH$_2$)$_4$CO]—     (B)

—[NH(CH$_2$)$_5$CO]—     (C)

It is preferable that a ratio of the repeating unit (A) in the copolyamide resin is 30% by weight or more. In particular, it is preferable that the ratio of the repeating unit (A) in the copolyamide resin is 40 to 90% by weight and the total ratio of the repeating unit (B) and the repeating unit (C) therein is 10 to 60% by weight.

The melting point of the copolyamide resin is preferably 60 to 160° C.

It is preferable that the copolyamide resin has a glass transition temperature of −20 to 50° C.

It is preferable that the copolyamide has a number-average molecular weight of 1,000 to 50,000.

It is preferable that the carbon fibers which constitute the carbon fiber bundle has resin lumps scatteringly present on the surface thereof, the resin lumps having a major axis length less than 10 μm and a thickness of 10 nm or more.

It is preferable that at least 60% by area of the surface of the carbon fibers which constitute the carbon fiber bundle is coated with a resin having a thickness less than 10 nm. It is also preferable that the carbon fiber bundle of the invention is in the form of a tape in which the width thereof is larger than the thickness.

The manufacturing method of carbon fiber bundle in the invention is a manufacturing method of carbon fiber bundle by applying a sizing liquid to a carbon fiber bundle and drying the carbon fiber bundle, characterized in that the sizing liquid contains a copolyamide resin, the copolyamide resin containing the following repeating unit (A) and at least one of the following repeating unit (B) and repeating unit (C), and the copolyamide resin having a melting point of 180° C. or lower.

—[NH(CH$_2$)$_m$CO]— (m is an integer of 6 to 20.)  (A)

—[NH(CH$_2$)$_6$NHCO(CH$_2$)$_4$CO]—  (B)

—[NH(CH$_2$)$_5$CO]—  (C)

It is preferable that a drying temperature in the manufacturing method of carbon fiber bundle in the invention is the melting point or more of the copolyamide resin.

It is preferable in the manufacturing method of carbon fiber bundle in the invention that an opening treatment is conducted after the drying.

It is preferable in the manufacturing method of carbon fiber bundle in the invention that the copolyamide resin has a 50%-cumulative particle diameter $D_{50}$ of 0.25 μm or more.

It is preferable in the manufacturing method of carbon fiber bundle in the invention that the sizing liquid contains particles which have a 50%-cumulative particle diameter $D_{50}$ of less than 0.25 μm.

Furthermore, it is preferable that the manufacturing method of carbon fiber bundle in the invention includes a pressing treatment which is conducted after the drying. It is more preferable that the pressing treatment is conducted with two supports and one or more pressing members located between the supports and that the carbon fiber bundle at the time of the pressing treatment has a temperature of the glass transition temperature or more of the copolyamide resin.

The present invention further involves inventions relating to a carbon fiber product obtained by opening the carbon fiber bundle of the invention, a random mat which includes discontinuous fibers obtained by cutting the carbon fiber bundle, a composite material which includes the carbon fiber bundle and a matrix resin, and a manufacturing method of the carbon fiber bundle.

Effects of the Invention

According to the invention, a carbon fiber bundle excellent in terms of adhesion to matrix resins and handleability and carbon fiber products obtained from the carbon fiber bundle are provided. The invention further provides: a carbon fiber bundle in which a sizing agent is less apt to shed therefrom during processing steps; and carbon fiber products obtained including the carbon fiber bundle.

EMBODIMENTS FOR CARRYING OUT THE INVENTION

Figure 1:
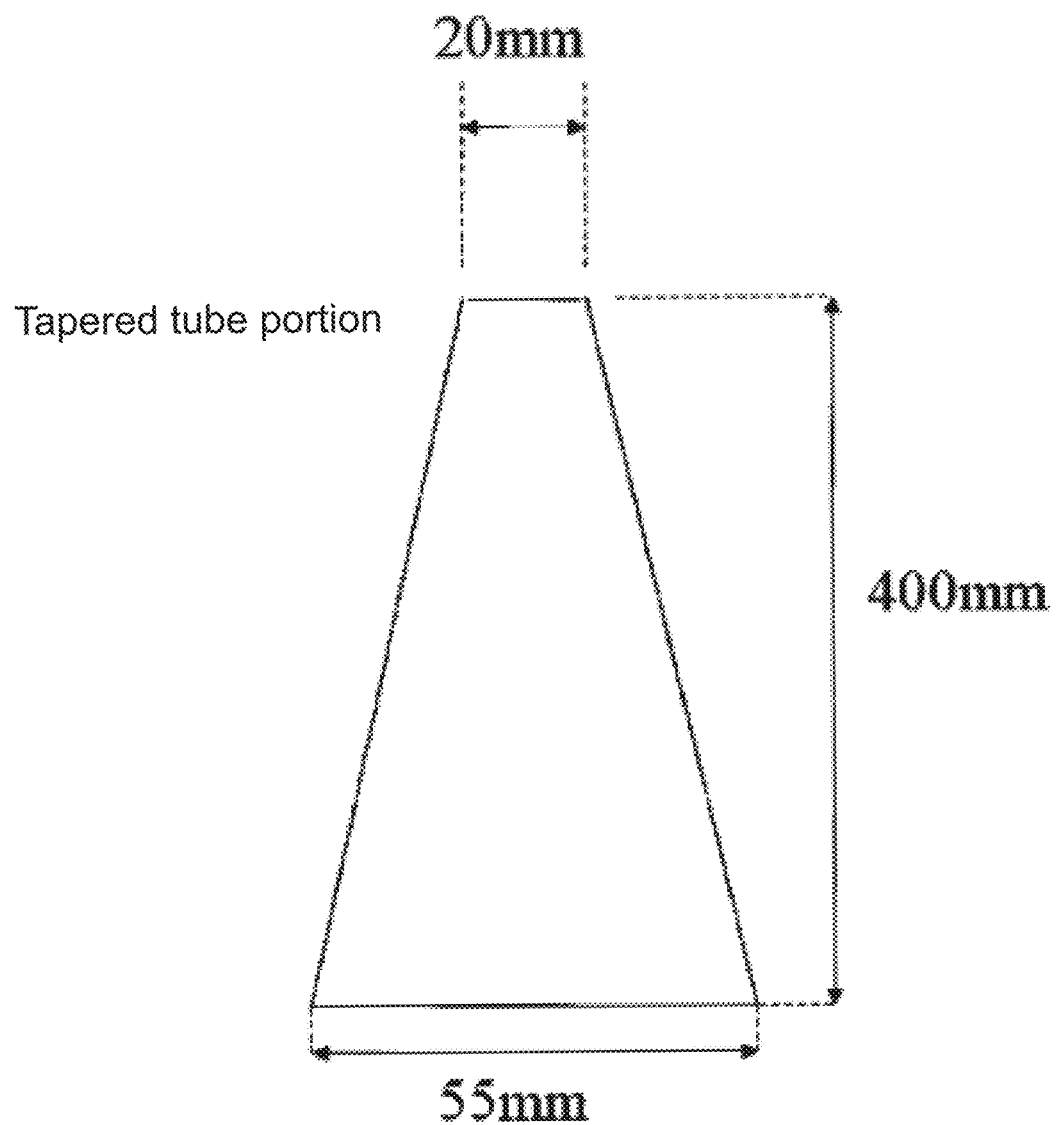
FIG. 1 is a diagrammatic view which illustrates a tapered tube.

The present invention is a carbon fiber bundle which has a sizing agent adherent to the surface thereof and in which the sizing agent includes a copolyamide resin. It is essential for the carbon fiber bundle of the invention that the copolyamide resin in the sizing agent contains the following repeating unit (A) and at least one of the following repeating unit (B) and repeating unit (C) and that the copolyamide resin has a melting point of 180° C. or lower.

—[NH(CH$_2$)$_m$CO]— (m is an integer of 6 to 20.)  (A)

—[NH(CH$_2$)$_6$NHCO(CH$_2$)$_4$CO]—  (B)

—[NH(CH$_2$)$_5$CO]—  (C)

The carbon fiber bundle of the invention has a feature wherein when the fiber bundle is opened to obtain a product, the sizing agent is less apt to shed from the carbon fiber bundle. From the standpoint of more remarkably showing the effects of the invention, it is preferable that the carbon fiber bundle has a shape which is easy to open and/or separate, i.e., in the form of a tape in which the width thereof is larger than the thickness. The carbon fiber bundle of the invention having such a shape not only improves the properties of the products to be obtained but also shows excellent handleability in later steps. Meanwhile, an opening step is a step for widening a fiber bundle. In a preferred embodiment, however, the opening step is an opening and separating step in which a fiber bundle is widened and separated into smaller fiber bundles.

In particular, the carbon fiber bundle of the invention has a feature wherein the shedding ratio of the sizing agent in the opening step is exceedingly low. Here, the shedding ratio of the sizing agent in an opening step can be determined using fiber bundles obtained from a carbon fiber bundle having, for example, a width of 8 to 12 mm and a thickness of 0.130 to 0.200 mm by cutting the bundle into a length of 5 to 100 mm. These carbon fiber bundles in a wide tape form are introduced into a tapered tube in which the carbon fiber introduction port has a diameter of 20 mm, the discharge port has a diameter of 55 mm, and the tube has a length of 400 mm in terms of the distance from the introduction port to the discharge port. Compressed air is passed therethrough so that the pressure of the compressed air being introduced into the tapered tube is 0.25 MPa. Thus, the ratio by weight of the sizing agent which shed from the carbon fiber bundles can be determined. The shedding ratio for these carbon fiber bundles can be evaluated in terms of the resultant difference in weight between before and after blowing of compressed air against the carbon fiber bundles. In cases when the shedding ratio is thus defined, it is desirable that the carbon fiber bundle of the invention, when opened in order to obtain a product, has a shedding ratio of the sizing agent of preferably 10% or less, and more preferably 5% or less.

The constituent elements of the invention are explained below in detail.

The carbon fiber bundle of the invention has a sizing agent adherent to the surface thereof, and this sizing agent includes a copolyamide resin. The copolyamide resin (hereinafter often referred to simply as "polyamide") which constitutes the sizing agent used in the invention is constituted so as to contain the following repeating unit (A) and at least one of the following repeating unit (B) and repeating unit (C).

—[NH(CH$_2$)$_m$CO]— (m is an integer of 6 to 20.)  (A)

—[NH(CH$_2$)$_6$NHCO(CH$_2$)$_4$CO]—  (B)

—[NH(CH$_2$)$_5$CO]—  (C)

The repeating unit (A) can be obtained by using, for example, an aminocarboxylic acid or a cyclic lactam when the polyamide is produced by copolymerization. Examples of the aminocarboxylic acid include 7-aminoheptanoic acid, 9-aminononanoic acid, 11-aminoundec anoic acid (ω-aminoundecanoic acid), and 12aminolauric acid (12-aminododecanoic acid). Examples of the cyclic lactam include w-heptalactam and w-laurinlactam.

The number "m" of (CH$_2$) groups in the repeating unit is an "integer of 6 to 20". The larger the number "m" of (CH$_2$) groups this repeating unit has, the higher physical strength and better the impact resistance the repeating unit has. Large values of "m" also have the effect of lowering the melting point of the sizing agent. In this connection, the lower the melting point of the sizing agent to be used in the carbon fiber bundle of the invention is, the more this sizing agent is effective when the sizing agent is melted and adhered to the surface of individual single fibers constituting the carbon fiber bundle in the drying treatment, or the like. However, in a case where the value of m is too large, this sizing agent has tendencies that the sizing agent has a low glass transition temperature, the sizing agent has tackiness after adhesion to carbon fibers, or the like. Namely, there is a tendency that the sized carbon fiber bundle has reduced handleability in later steps. In addition, in a case where the value of m is too large, this agent tends to be difficult to synthesize and be expensive.

Meanwhile, from the standpoint of water-absorbing properties, it is preferable that the value of m is small. In a case where the sizing agent has too high water-absorbing properties, there is a tendency that the carbon fiber bundle, when impregnated with a matrix resin in order to produce a composite material, tends to cause gas evolution or hydrolysis of the matrix resin, resulting in a decrease in the mechanical strength of the composite material. Because of this, the value of the number "m" of (CH$_2$) groups in this repeating unit is in the range of more preferably "8 to 15", especially preferably "10 to 13", and is optimally "11 or 12".

The polyamide(s) constituted of this repeating unit (A) may be of one kind or of multiple kinds. Especially preferred examples thereof are nylon-11 and nylon-12.

The copolyamide resin to be used in the invention has the repeating unit (B) or the repeating unit (C) besides the repeating unit (A). It is preferable that the copolyamide resin has both of the repeating unit (B) and the repeating unit (C).

The repeating unit (B) corresponds to the so-called nylon-6,6. This repeating unit can be obtained, for example, by using the hexamethylene/ammonium salt of adipic acid during copolymerization.

The repeating unit (C) corresponds to the so-called nylon-6. This repeating unit can be obtained, for example, by using ε-caprolactam as a starting material during copolymerization.

Especially preferred examples of the copolyamide to be used in the invention include one constituted by a copolyamide produced from the monomer for nylon-11 or nylon-12 as the component (A), the monomer for nylon-66 as the component (B), and the monomer for nylon-6 as the component (C). Although such polymers or copolymers having these components can be used alone, a mixture of two or more thereof may also be used.

The ratio of the repeating unit (A) to the repeating unit (B) and/or the repeating unit (C) is not particularly limited. In the invention, however, it is essential to use a copolyamide in which both at least one kind of repeating unit (A) and at least one of the repeating unit (B) and the repeating unit (C) are present as constituent units. It is preferred in the invention that the copolyamide contains the repeating unit (A) in an amount of 30% by weight or more based on the total weight. More preferred is a copolyamide in which contains the repeating unit (A) in an amount of 40 to 90% by weight. In a case where the content of repeating unit (A) is too low, this copolyamide tends to have too high a melting point, resulting in a decrease in adhesion between the carbon fibers and matrix resins. Conversely, too high contents of repeating unit (A) result in too low contents of the other components and this copolyamide tends to have too high a melting point. With respect to the copolymerization amount of the repeating unit (A), it is preferable that the copolyamide contains the repeating unit (A) in an amount of 50 to 80% by weight, preferably 60% by weight or more, which is more than a half, and especially 65 to 75% by weight.

The remaining repeating unit (B) or (C), even when used alone in combination with the component (A), shows the effects of the invention. However, it is preferable that the copolyamide contains both of the repeating components (B) and (C). With respect to the content thereof, the total ratio of the repeating unit (B) or the repeating unit (C) is preferably 70% by weight or less, more preferably in the range of 10 to 60% by weight. Although other polyamide components may be contained in a small amount, it is preferable that the total content of the three components, i.e., the repeating units (A), (B), and (C), is 80% by weight or more, in particular, 100% by weight.

Although the melting point of the copolyamide to be used in the invention needs to be 180° C. or lower, the melting point thereof is more preferably 160° C. or lower. Especially preferably, the melting point thereof is as low as 60 to 140° C. In a case where the melting point thereof is too low, the composite material to be finally obtained has reduced properties. Conversely, in a case where the melting point thereof is too high, it is difficult to melt the component of the sizing agent on the fibers constituting the fiber bundle, making it impossible to sufficiently show the effects of the invention. Especially in the case where the copolyamide has a low melting point of 140° C. or below, the sizing agent on the monofilaments can be melted by an ordinary heat treatment at about 150° C. and this treatment achieves not only an improvement in property but also an improvement in productivity.

It is preferable that the copolyamide resin to be used in the invention has a glass transition temperature of −20 to 50° C.

The glass transition temperature thereof is more preferably 20° C. or more and 40° C. or less. By thus keeping the glass transition temperature thereof low and suitably selecting drying conditions, or the like, the sizing agent can be adhered to the surface of the fibers constituting the carbon fiber bundle, in such a form that adhesion and handleability are improved.

It is preferable that the copolyamide to be used in the invention has a number-average molecular weight of 1,000 to 50,000. The number-average molecular weight thereof is especially preferably 2,000 to 10,000. Higher molecular weights facilitate improvements in the properties of the composite material to be finally obtained. However, in a case where the molecular weight thereof is too high, the compatibility with matrix resins tends to decrease to cause a problem concerning interfacial separation, resulting in a tendency that the composite material to be finally obtained has reduced properties.

The sizing agent to be used in the invention may contain other ingredients, besides the copolyamide resin, so long as the amount thereof is small and the objects of the invention are not defeated thereby. For example, it is preferable that the sizing agent contains a salt of a carboxylic acid, besides the copolyamide, for the purpose of improving adhesion to the carbon fibers.

Examples of the salt of a carboxylic acid include fatty acid ammonium salts such as ammonium laurate, ammonium oleate, and ammonium stearate; ammonium salts of polyoxyethylene alkyl ether carboxylates, such as ammonium polyoxyethylene lauryl ether acetate; N-acylamino acid ammonium salts such as ammonium N-lauroyl-N-methyl-β-alanine and ammonium N-lauroyl-N-methylglycine; ammonium salts of ethylene/α,β-unsaturated carboxylic acid copolymers, such as ammonium salts of ethylene/acrylic acid copolymers and ammonium salts of ethylene/methacrylic acid copolymers; and other salts such as ammonium salts of styrene/maleic anhydride copolymers, ammonium salts of isobutylene/maleic anhydride, poly(acrylic acid) ammonium salts, ammonium salts of poly(acrylic acid)acrylic ester copolymers, ammonium salts of carboxymethyl cellulose, ammonium alginate, and ammonium salts of methyl vinyl ether/maleic anhydride.

It is especially preferred to use an ammonium salt of an ethylene/acrylic acid copolymer. In this case, a modification amount of acrylic acid is preferably 1% by weight or more, more preferably 5 to 50% by weight, especially preferably 15 to 30% by weight. By increasing the modification amount, the affinity for both the copolyamide and the matrix resin can be improved. However, too large modification amounts tend to result in a decrease in flexibility and a decrease in adhesion. Meanwhile, the degree of neutralization with ammonia of the ammonium salt is preferably 0.05 or more, especially preferably about 0.5 to 0.9. Too low degrees of neutralization may result in cases where the emulsion has poor stability, while too high degrees of neutralization may result in cases where the dispersibility decreases rather than increases.

Those carboxylic acid salts may be used alone or as a mixture of two or more thereof.

It is preferable that the sizing agent to be used in the invention is a mixture including 0.01 to 50 parts by weight of a carboxylic acid salt with respect to 99.99 to 50 parts by weight of the copolyamide. It is more preferred to use a mixture including 99.9 to 70 parts by weight of the copolyamide and 0.1 to 30 parts by weight of a carboxylic acid salt. In the sizing agent according to the invention, the adhesion-improving effect tends to be exhibited so long as the ratio of the carboxylic acid salt incorporated is 0.01 parts by weight or more. So long as the ratio thereof is 50 parts by weight or less, the performance inherent in the copolyamide resin tends to be exhibited.

Furthermore, the sizing agent may contain a surfactant so long as the amount thereof is slight. It is, however, preferable that the amount thereof is small because surfactants tend to inhibit adhesion. It is preferable that the surfactant to be contained is a nonionic surfactant having a low molecular weight. It is preferable that the surfactant is one which has a boiling point lower than 200° C., more preferably lower than 150° C. Usually, a surfactant is used in order to enable the components of the sizing agent to be stably present in the sizing liquid, and it is preferable that the surfactant volatilizes in the drying step after application of the sizing liquid and the carbon fiber bundle does not finally contain the surfactant.

The carbon fiber bundle of the invention is a carbon fiber bundle which has, a sizing agent including the copolyamide resin described above, which is adherent to the surface thereof.

The carbon fiber bundle according to the invention needs to be a bundle constituted by collecting a plurality of single fibers, which are a carbon fiber. As the carbon fibers constituting each of the single fibers, use can be made of any carbon fibers such as polyacrylonitrile (PAN)-based carbon fibers, petroleumcoal pitch-based carbon fibers, rayon-based carbon fibers, and lignin-based carbon fibers. In particular, PAN-based carbon fibers, which are produced from PAN as a starting material, are preferred because these carbon fibers are excellent in terms of industrial-scale manufacturability and mechanical property.

The carbon fibers have an average diameter of preferably 3 to 12 μm. A more preferred range of the average diameter thereof is 5 to 10 μm. In a case where the average diameter of the carbon fibers is too small, it is necessary to increase the total number of fibers for obtaining the same reinforcing effect. As a result, there are cases where this fiber ingredient is bulky and gives a composite material in which the volume fraction of the fibers cannot be heightened, and it is difficult to obtain a composite material having excellent mechanical strength. The carbon fibers according to the invention are stiff inorganic fibers, and that tendency is especially strong. Meanwhile, in a case where the average diameter of the carbon fibers is too large, there is a tendency that sufficient fiber strength is difficult to ensure. In addition, it is impossible to fully complete a flameproofing or infusibility-imparting treatment of carbon-fiber precursor fibers, and the carbon fibers to be finally obtained tend to have reduced mechanical properties.

The carbon fiber bundle of the invention need not be always constituted by long fibers, and it is also preferable that the carbon fiber bundle is a fiber bundle constituted by short fibers (discontinuous fibers). In the case where short fibers constitute the bundle, the length thereof is preferably 100 mm or less, especially preferably in the range of 5 to 80 mm.

The number of the constituent carbon fibers as monofilaments (single fibers) which constitute the carbon fiber bundle is preferably 100 or more, more preferably 500 or more, especially preferably 1,000 or more. In a case where the number of the monofilaments constituting the fiber bundle is too small, this carbon fiber bundle has enhanced flexibility and hence improved handleability but the manufacturability of carbon fibers decrease considerably. Meanwhile, in a case where the number thereof exceeds 60,000, it is difficult to fully complete a flameproofing or infusibility-imparting treatment of carbon-fiber precursor fibers, and the carbon fibers to be finally obtained tend to have reduced mechanical properties. Consequently, it is preferable that the number thereof is generally 60,000 or less, especially 50,000 or less. A more preferred range of the number of the monofilaments which constitute the fiber bundle is 3,000 to 40,000 (so-called 3K to 40K), more preferably 5,000 to 30,000 (5K to 30K).

It is preferable that the carbon fiber bundle of the invention is in the form of a tape in which the width is larger than the thickness, from the standpoint that the bundle can be easily opened thereafter. It is preferable that the carbon fiber bundle has a width, per 10,000 filaments (10K), of 2 mm/10K or more, desirably in the range of 2 to 15 mm/10K, especially in the range of 3 to 10 mm/10K, although the width thereof depends on the thickness of each of the single fibers constituting the carbon fiber bundle and on the number of filaments. Most preferably, the width thereof is in the range of 4 to 8 mm/10K. In a case where the width thereof is too small, this carbon fiber bundle tends to have impaired openability or separability and to have reduced resin impregnation property, finally giving a composite having reduced properties. Conversely, in a case where the width thereof is too large, this carbon fiber bundle tends to have width-direction unevenness in thickness and to result in unevenness in resin impregnation, and to give a final composite having reduced properties.

It is preferable that the carbon fiber bundle has a thickness, per 10,000 filaments (10K), of 0.2 mm/10K or less, desirably in the range of 0.05 to 0.15 mm/10K. It is preferable that the carbon fiber bundle of the invention is in the form of a tape in which a ratio of width to thickness is 10 or more, desirably in the range of 20 to 200. In cases when the carbon fiber bundle is such a flat fiber bundle, the subsequent opening and separating are conducted smoothly. Even when the carbon fiber bundle of the invention has such a thin shape, the fibers have moderate bundling properties and this carbon fiber bundle has high process stability which enables the bundle to smoothly pass through the subsequent processing steps.

It is also preferred to use carbon fibers in which oxygen-containing functional groups are introduced into the surface of the carbon fibers through a surface treatment in order to enhance adhesion between the carbon fibers and matrix resins.

It is preferable that the carbon fiber bundle of the invention has a degree of collection in the range of 30 to 180 g. Here, the degree of collection of a fiber bundle is measured with a Handle-O-Meter (HOM-200, manufactured by Daiei Kagaku Seiki Mfg. Co., Ltd.) by: placing the carbon fiber bundle on a test table; and measuring a resistance force (g), i.e., a handle degree, the resistance force generated by pushing the specimen into the groove to a given depth (8 mm) with a blade. The degree of collection of the carbon fiber bundle of the invention is preferably in the range of 70 to 200 g, more preferably in the range of 100 to 180 g. In the case where the value evaluated with the Handle-O-Meter is within that range, this carbon fiber bundle can be moderately widened and separated, especially when a random mat is produced from cut pieces of the carbon fiber bundle while blowing air thereagainst and spraying the cut fibers. Namely, this carbon fiber bundle is optimal for opening.

Although the carbon fiber bundle of the invention is a fiber bundle which has, adherent to the surface thereof, the sizing agent including the copolyamide resin described above, the state of adhesion of the sizing agent is preferably as follows: resin lumps having a major-axis length less than 10 µm and a thickness of 10 nm or more (hereinafter often referred to as "resin lumps (A)") are scatteringly present on the surface of the carbon fibers (single fibers) which constitute the carbon fiber bundle. It is more preferable that these resin lumps has an indefinite shape or an elliptic shape and have a size of 0.1 to 5 µm in terms of the dimension of the longest portion (major-axis length in the case of ellipses). The dimension of the shortest portion (minor-axis length in the case of ellipses) is preferably in the range of 0.05 to 4 µm, more preferably in the range of 0.5 to 2 µm. The thickness of the resin lumps (A) is preferably 10 to 500 nm, more preferably 50 nm or more and less than 400 nm, especially preferably 100 nm or more and less than 300 nm. Meanwhile, the thickness of a resin adherent to the surface of the carbon fiber can be ascertained, for example, by forming a fracture section of the carbon fiber and examining the fracture section.

In the case where such resin lumps (A) are scatteringly present on the surface of the carbon fibers according to the invention, the scattering sizing agent not only enhance the compatibility with the matrix resin when a composite material is finally molded, but also more effectively serve as a plasticizer for the matrix resin to further enhance the impregnation of the matrix resin into the inside of the carbon fiber bundle. Consequently, with respect to the distribution of the resin lumps (A), it is preferable that the lumps are moderately and evenly present on the surface of the carbon fibers.

Such resin lumps (A) can be formed by selecting a suitable melt viscosity of the resin at the drying temperature. Specifically, the melt viscosity of the resin for forming such resin lumps (A) is preferably 2,000 Pa·s or more and less than 5,000 Pa·s in terms of melt viscosity at a shear rate of 6 s$^{-1}$ and at the drying temperature for the carbon fiber bundle. The melt viscosity thereof is more preferably 2,100 to 3,500 Pa·s. In a case where the melt viscosity thereof is too low, the resin lumps (A) tend to spread while wetting the surface of the carbon fibers and disappear. Meanwhile, in a case where the melt viscosity thereof is too high, the resin particles adhered to the surface of the carbon fibers partly remain unmelted and cannot be fixed to the fiber surface. Consequently, the resin particles tend to shed in later steps.

Furthermore, it is preferable that the surface of the carbon fibers (single fibers) constituting the carbon fiber bundle has a thin resin having a thickness less than 10 nm (hereinafter sometimes referred to as "resin coating (B)"), besides the resin lumps described above, so that at least 60% in area of the fiber surface is covered with the thin resin. With respect to covering area, it is preferable that 80% or more, especially 95% or more, of the area of the surface is covered therewith. The thickness thereof is preferably 0.5 nm or more, more preferably 1 nm or more, and an optimal range thereof is 2 to 10 nm.

By disposing the resin constituting the sizing agent so that the resin covers the surface of the carbon fibers thinly and widely, affinity between the carbon fibers and the matrix resin is heightened to improve moldability. In particular, due to the presence of such resin coating (B), short-time high-cycle molding is rendered easier. That the resin coating (B) is adherent to a great ratio of the surface of a fiber can be observed, for example, through an observation with a scanning electron microscope operated at a low accelerating voltage of 0.05 to 0.5 kV. In a case where the thickness of this resin coating (B) is too large like, for example, resin lumps or the like, there is a tendency that the absolute amount of the sizing resin adherent to the carbon fibers is too large, finally resulting in a composite material having reduced properties. Meanwhile, in a case where the thickness of this resin coating (B) is too small, there is a tendency that the affinity for the matrix resin cannot be heightened, resulting in a decrease in impregnation property.

Such resin coating (B) connected to the resin lumps (A) of indefinite shapes is formed due to a molecular weight distribution of resin particles contained in the sizing agent. Specifically, a low-molecular-weight component has a low viscosity and wets and spreads over the surface of reinforcing fibers to form the resin coating (B), while a high-molecular-weight component has a high viscosity to form the resin lumps (A) of indefinite shapes. Since the copolyamide resin to be used in the invention is a copolymer, this resin is thought to have such a molecular weight distribution.

In addition, it is preferable that the surface of the carbon fibers which constitute the carbon fiber bundle of the invention has fine concaves and convexes. It is furthermore preferable that fine resin lumps (hereinafter sometimes referred to as "resin lumps (C)") are present also within the fine concaves and convexes of the fiber surface. It is preferable that the thickness of the fine resin lumps (C) is 10 to 100 nm, desirably 20 to 80 nm, especially 30 nm or more and less than 60 nm. It is preferable that the width thereof is less than 500 nm, especially less than 100 nm. It is preferable that the fine resin lumps are present along creases of the fine concaves and convexes of the fiber surface, the creases extending in the fiber axis direction, and the length thereof is not particular limited.

Although the carbon fiber bundle of the invention is constituted by a large number of carbon fibers (single fibers), it is preferable that connecting resin lumps (hereinafter sometimes referred to as "resin lumps (D)") which connect the carbon fibers (single fibers) constituting the carbon fiber bundle are present therebetween. It is preferable that the connecting resin lumps has a thickness in a range of 10 to 2,000 nm. With respect to the shape thereof, the connecting resin lumps are a rod-shaped resin lump which connects single fibers to each other. Usually, these resin lumps (D) are in the form of a rod of 10 μm or more in which the major axis extends along the fiber axis direction.

In a method for forming the resin lumps (D), a particle diameter distribution for large particles in the sizing agent is important. Such rod-shaped resin lumps (D) are lumps formed by accumulation and aggregation of particles in spaces between monofilament fibers. Since these resin lumps (D) serve to bond fibers to each other, the resin lumps (D) have the effect of, in particular, collecting and bundling a large number of carbon fibers to form a carbon fiber bundle. Furthermore, like the resin lumps (A) of indefinite shapes, the resin lumps (D) enhance the impregnation of matrix resins. Consequently, when, for example, a random mat is produced from cut pieces of the carbon fiber bundle while blowing air thereagainst and spraying the cut fibers, the resin lumps (D) maintain the bundling of fiber bundle to effectively prevent the cut fiber bundles from obtaining a bulky mat in cottony state. The thickness of the rod-shaped resin lumps (D) is preferably 10 nm or more and less than 2,000 nm, more preferably 100 nm or more and less than 1,000 nm.

It is preferable that in the carbon fiber bundle of the invention to which a resin is adhered, the resin ingredient is adherent to surface-layer surfaces in a larger amount than to inner-layer surfaces.

The carbon fiber bundle of the invention described above can be obtained, for example, by the manufacturing method of a carbon fiber bundle in the invention. Namely, the manufacturing method of a carbon fiber bundle in the invention is a manufacturing method of carbon fiber bundle by applying a sizing liquid to a carbon fiber bundle and drying the carbon fiber bundle, wherein the sizing liquid contains a copolyamide resin, the copolyamide resin contains the following repeating unit (A) and at least one of the following repeating unit (B) and repeating unit (C), and the copolyamide resin has a melting point of 180° C. or lower.

—[NH(CH$_2$)$_m$CO]— (m is an integer of 6 to 20.) (A)

—[NH(CH$_2$)$_6$NHCO(CH$_2$)$_4$CO]— (B)

—[NH(CH$_2$)$_5$CO]— (C)

The carbon fiber bundle to be used and the copolyamide resin contained in the sizing liquid to be used can be the same as those described above with regard to the carbon fiber bundle of the invention.

Although it is essential for the sizing liquid to be used in the manufacturing method of a carbon fiber bundle in the invention that the copolyamide resin is contained as a main component, the sizing liquid may contain ingredients other than the copolyamide so long as the objects of the invention are not defeated thereby. For example, it is preferable that the sizing liquid contain a salt of a carboxylic acid, besides the copolyamide, for the purpose of improving adhesion to the carbon fibers. The kind and addition amount of the carboxylic acid salt are the same as those described above with regard to the carbon fiber bundle of the invention. Such carboxylic acid salts may be used alone or as a mixture of two or more thereof.

In the manufacturing method of a carbon fiber bundle in the invention, it is preferable that the sizing liquid to be used is an aqueous system. In particular, from the standpoint of adhering a sizing agent to the surface of a carbon fiber bundle, it is preferred to use a dispersion (emulsion) constituted by a sizing agent and water. This dispersion may contain various additives so long as the objects of the invention are not defeated thereby. As an additive, a surfactant may, for example, be used for the purpose of heightening the stability of the aqueous dispersion.

With respect to specific examples of the surfactant, it is preferred to use a nonionic surfactant or an anionic surfactant. It is especially preferred to use a nonionic surfactant. This is because nonionic surfactants satisfactorily stabilize the dispersed particles in the dispersion and because nonionic surfactants are apt to decompose or volatilize in a water removal step and a matrix impregnation step and finally remain little on the surface of the carbon fiber bundle. Preferred examples of the nonionic surfactant include polyoxyalkylene alkyl ethers represented by the following formula (I).

H$_{2n+1}$Cn—O—(X—O)$_p$—H (1)

(n=integer of 8 to 22; p=integer of 2 to 20; X=alkylene group having 1 to 5 carbon atoms)

The number of carbon atoms of the alkylene group represented by X is preferably 2 to 5. Examples of polyoxyethylene alkyl ethers include polyoxyethylene lauryl ether, polyoxyethylene cetyl ether, and polyoxyethylene oleyl ether.

Furthermore, nonionic surfactants having a low molecular weight are preferred. Alternatively, surfactants which are apt to volatilize or decompose are preferred, and surfactants which volatilize or decompose at a temperature lower than 200° C., more preferably lower than 150° C., are preferred. This is because such a surfactant decomposes or volatilizes in steps for manufacturing carbon fiber bundle and is less apt to adversely affect the final interfacial adhesion between the carbon fibers and the matrix resin. It is preferable that the content of the surfactant is 0.01 to 8 parts by weight per 100 parts by weight of the solid resin components of the sizing agent.

In the case where the sizing liquid to be applied to a carbon fiber bundle is an aqueous dispersion, there are no particular limitations on the amount ratio between the sizing agent and the water in the aqueous dispersion so long as the dispersion is homogeneous. Preferred amount ratios are such that the amount of the water is 900 to 999,900 parts by weight per 100 parts by weight of the polyamide. More preferably, the amount of the water is 1,900 to 99,900 parts by weight per 100 parts by weight of the polyamide.

The particles in the aqueous dispersion thus obtained have a weight-average particle diameter of preferably 0.1 to 1,000 μm, more preferably 0.1 to 500 μm. It is preferable that the resin concentration in the aqueous dispersion is regulated to 1 to 70% by weight.

Furthermore, it is preferable, in the manufacturing method of a carbon fiber bundle in the invention, that the copolyamide resin contained as a main component in the sizing liquid has a 50%-cumulative particle diameter $D_{50}$ of 0.25 μm or more. It is also preferable that the sizing liquid contains particles which have a 50%-cumulative particle diameter $D_{50}$ of less than 0.25 μm. It is especially preferred that the sizing liquid contains both particles constituted by the copolyamide resin and having a particle diameter $D_{50}$ of 0.25 μm or more (also called fine particles) and particles having a particle diameter $D_{50}$ less than 0.25 μm (also called microparticles). Although the microparticles may be made from the same material as the copolyamide resin as a component of the fine particles, it is preferable that the microparticles be made from a different resin.

An especially preferred manufacturing method of the carbon fiber bundle in the invention is a method in which a sizing agent is applied to the surface of carbon fibers and the carbon fibers are dried by heating, wherein the sizing agent applied to the surface of the carbon fibers includes fine particles and microparticles and wherein the fine particles are constituted by the copolyamide described above and the drying by heating is conducted at a temperature of the melting point or more of the fine particles.

Here, the term "fine particles" means fine particles having a 50%-cumulative particle diameter $D_{50}$ of 0.25 μm or more, and the term "microparticles" means microparticles having a 50%-cumulative particle diameter $D_{50}$ of less than 0.25 μm. By using such two kinds of particles, i.e., the fine particles and the microparticles, a balance between the impregnation property of a carbon fiber bundle with the sizing agent and the handle of the fiber bundle obtained through the impregnation and drying is optimized.

Here, values of particle diameter $D_{50}$, which is the particle diameter of a volume fraction at 50%, are employed as values of particle diameter. More specifically, this particle diameter is determined through an examination with a laser diffraction type particle size distribution analyzer by the value of $D_{50}$, and means a particle diameter in which 50% by volume of the particles are involved. However, $D_{10}$ and $D_{90}$ are used in some cases; $D_{10}$ means the particle diameter of a volume fraction located at 10% from the smaller-particle side, and $D_{90}$ means the particle diameter of a volume fraction located at 90% from the smaller-particle side.

Although the sizing liquid, in the manufacturing method of a carbon fiber bundle in the invention, contains the copolyamide resin, this resin is generally present as a component of the fine particles which are relatively large and have a particle diameter $D_{50}$ of 0.25 μm or more. With respect to sizes of the fine particles, the $D_{50}$ thereof is preferably 0.60 μm or less. The $D_{10}$ of the fine particles is preferably 0.05 μm or more and 0.25 μm or less, and the $D_{10}$ thereof is more preferably 0.10 μm or more and 20 μm or less. Furthermore, the $D_{90}$ thereof is preferably 0.25 μm or more and 1.5 μm or less, and the $D_{90}$ thereof is more preferably 0.30 μm or more and 1.2 μm or less.

Moreover, it is preferable that the particle diameter of the fine-particle component of the sizing agent to be used in the manufacturing method of a carbon fiber bundle in the invention is not larger than about one half of the diameter of the carbon fibers to be used. For example, in the case of using carbon fibers having a fiber diameter of 7 μm, the particle diameter of the fine-particle component is preferably 3.5 μm or less. In the case of using carbon fibers having a fiber diameter of 10 μm, the particle diameter of the fine-particle component is preferably 5.0 μm or less. It is more preferable that an optimal range of the $D_{50}$ thereof, in the case of using carbon fibers having a fiber diameter of 10 μm or less, is 0.25 to 1.5 μm.

Meanwhile, preferred microparticles are ones in which the constituent resin has a particle diameter less than 0.25 μm in terms of $D_{50}$. Due to the inclusion of such microparticles, the sizing agent is easily impregnated into inner parts of the fiber bundle strand to enable the carbon fiber bundle to show improved impregnation property with a matrix resin. With respect to sizes of such microparticle component, the 90%-cumulative particle diameter $D_{90}$ of the microparticles is preferably less than 0.35 μm, and the $D_{90}$ thereof is more preferably less than 0.3 μm. The $D_{10}$ thereof is preferably 0.15 μm or less. This microparticle component may be a copolymer resin, and various properties thereof including melting point, and the like, can be controlled by changing the copolymerization ratio.

Since this microparticle component of the sizing agent has a small size, the microparticles are not only readily impregnated into inner parts of the carbon fiber bundle but also are apt to be compatibilized with the matrix resin to be composited with the carbon fiber bundle. Consequently, the carbon fiber bundle obtained using this sizing agent, when composited with a matrix resin, gives an excellent carbon-fiber-reinforced resin composite. Furthermore, it is preferable that the matrix resin has a solubility parameter which is close to that of the microparticle component, and it is preferable that one component of the copolymer which constitutes the microparticles is of the same kind as the matrix resin.

It is preferable that the melting point of the microparticle component is lower than the melting point of the matrix resin constituting a composite. Specifically, the melting point or softening point of the microparticle component is preferably in the range of 50° C. to 200° C., especially preferably in the range of 80° C. to 150° C.

Such microparticle component of the sizing agent to be used in the invention is not particularly limited. Especially suitable examples of the main component thereof include polyolefin resins, polyamide resins, polycarbonate resins, and polyester resins. Also usable are copolymers, modified materials, and a mixture of two or more thereof. Especially in the case where any of those resins can be obtained as a general dispersion in water or can be dissolved in water to obtain an aqueous solution, these resins are suitable for use in the invention. Moreover, in the case where the main component is, for example, a polyolefin resin, high compatibility with polyolefin resins, such as polypropylene, is obtained. In the case where the main component is a polyamide, polycarbonate, or polyester resin, high adhesion to highly polar resins is obtained.

In the case where the microparticle component has such a small particle diameter, the sizing liquid can more finely wet the entire carbon fibers within the strand. As a result of this effect, the carbon fiber bundle shows improved resin impregnation property when molded later together with the matrix resin. Furthermore, such a small particle diameter of the microparticle component is effective also in inhibiting the strand from rounding in the direction (direction in fiber arrangement) which forms an angle of 90° with the longitudinal direction of the strand. This is thought to be because the microparticles having a small particle diameter are evenly adhered to the fiber surface in each of the front, back, and inner parts of the strand, as compared with the case where the particle diameter thereof is large, and the carbon fiber bundle, especially when being flat, has a smaller difference in the thermal expansion of the sizing-agent resin between the front and back thereof. Although the strand is inhibited from rounding by using a specific copolyamide resin in the invention, the effect is enhanced by using the microparticle component in combination therewith.

Although the copolyamide resin is an essential component in the invention, this resin, in many cases, is in the form of fine particles having a particle diameter $D_{50}$ of 0.25 μm or more. In the invention, use of fine particles having such a relatively large size enables the carbon fiber bundle strand to retain a more highly bundled state and to attain an improvement in handleability. This configuration is effective especially for producing a composite in a form such as random mat. This is because the configuration makes it possible to obtain the handle of the fiber bundle (fibers) which is advantageous for widening or opening the carbon fiber bundle strand and for random application.

The manufacturing method of a carbon fiber bundle in the invention is a method in which the sizing liquid described above is applied to a carbon fiber bundle and this carbon fiber bundle is dried.

It is preferable that the manufacturing method of a carbon fiber bundle in the invention includes the following steps 1) and 2).
1) Immersion step in which the sizing liquid (dispersion) including a sizing agent and water is applied to a carbon fiber bundle
2) Drying step in which water is removed from the carbon fiber bundle obtained in 1) above Each step is described below in detail.

In the immersion step 1), it is preferable that the dispersion (sizing liquid) is applied to a carbon fiber bundle so that the sizing agent adheres in an amount of 0.01 to 10 parts by weight in terms of final dry-basis weight of the sizing agent per 100 parts by weight of the carbon fiber bundle. Here, the dispersion includes the sizing agent and water. Methods for applying the aqueous dispersion to a carbon fiber bundle are not particularly limited so long as the surface of the carbon fiber bundle can finally be evenly coated with the sizing agent. Conventionally known methods can be used. Specific examples of the methods include a spraying method, a roller immersion method, and a roller transfer method. These methods may be used alone or in combination. Of these sizing methods, the roller immersion method is preferred because this method is excellent in terms of manufacturability and evenness. When a carbon fiber strand is immersed in an aqueous emulsion, it is important that the strand is repeatedly opened (widened) and squeezed with immersion rollers disposed in the emulsion bath, thereby impregnating the aqueous emulsion into the strand. The amount of the sizing agent to be adhered to the carbon fibers can be regulated by adjusting the concentration of the sizing liquid, the squeezing rollers, or the like.

The carbon fiber bundle subjected to the sizing-liquid impregnation step 1) is subsequently subjected to a drying treatment to remove the water. Methods for the drying treatment are not particularly limited, and examples thereof include heat treatment, air drying, and centrifugal separation. Of these, heat treatment is preferred. By conducting heat treatment as the drying treatment, not only the water is removed from the carbon fiber bundle subjected to the sizing treatment, but also a solid component of the sizing agent contained in the sizing liquid can be melted and evenly dispersed on the surface of the carbon fibers which constitute the carbon fiber bundle. From this standpoint, it is preferable that the drying is conducted at a temperature of the melting point or more of the copolyamide resin which is a main component contained in the sizing liquid.

As a means for heating for the heat treatment, use can be made, for example, of hot air, a hot plate, a roller, an infrared-ray heater, or the like. Preferred temperatures for the heat treatment are about 60° C. to 150° C. in terms of the temperature of the material (temperature of the carbon fibers). So long as the temperature is within that range, the desired carbon fiber bundle can be obtained without deteriorating the resin(s) of the sizing agent and the carbon fiber bundle.

After the drying, the content of water is preferably 0 to 1 part by weight per 100 parts by weight of the carbon fibers.

In the invention, in the case where the sizing liquid to be used is an aqueous dispersion, the sizing agent is in the form of emulsion particles when the sizing liquid is adhered to the carbon fiber bundle. It is preferable that the emulsion particles melt simultaneously with the removal of water in the drying step to form a coating film on the surface of the carbon fibers. The coating film improves adhesion to matrix resins.

Furthermore, in the manufacturing method of a carbon fiber bundle in the invention, it is preferred to conduct a pressing treatment after the drying step 2). It is more preferable that the pressing treatment is conducted with two supporting members and one or more pressing members located between the supporting members and that the carbon fiber bundle at the time of the pressing treatment has a temperature of the glass transition temperature or more of the copolyamide resin contained in the sizing agent. It is preferable that each pressing member is not a member which inhibits the fiber bundle from moving, such as nip rolls, but a member which pushes the middle of the fiber bundle held under tension. By using such a pressing member which does not fix the fiber bundle, both widening and inhibition of curling are more effectively attained.

It is preferable that the strand which enters the first supporting member has a moisture content less than 30 wt %, preferably less than 10 wt %, more preferably less than 3 wt %. In a case where the drying is insufficient and the strand contains water in a large amount, the pressing treatment tends to arouse troubles, for example, that the resin on the surface of the fiber bundle adheres to the supporting member or pressing member which has heated up to a high temperature or the strand is caught by the resin which has become tacky.

More specifically, the pressing treatment of the carbon fiber bundle may be a method in which there are two supporting members arranged along the movement direction of the carbon fiber bundle and one or more pressing members located between the supporting members. A pressing member is disposed at approximately middle between two of the supporting members and pressing members other than the pressing member, wherein the two are adjacent to the pressing member. The pressing member is apart from the plane which includes the carbon-fiber-bundle sliding contact surface of the two of the supporting members or the pressing members which are adjacent to the pressing member. The pressing treatment is carried out by continuously passing the carbon fiber bundle on the pressing member. It is preferable that the front surface and back surface of the fiber bundle alternately come into contact with the supporting member or the pressing member. In this case, the two supporting members may serve also as rolls, e.g., a winding roll, so long as the one or more pressing members used can apply a pressure to the carbon fiber bundle.

It is preferable that the supporting members or the pressing members are rod-shaped objects disposed perpendicularly to the movement direction of the reinforcing-fiber bundle, so that pressure application is rendered easy. In the case of rod-shaped objects, an optimal range of the diameter thereof is 0.5 to 10 cm. In cases when such rod-shaped objects having a small roll diameter are used, the time period when the fiber bundle is in direct contact with the pressing member is shorter and fluffing during this step can be reduced. Furthermore, it is preferable that the supporting members or the pressing members are rotating objects. Although unsuitable for pressure application, rotating objects inhibit the fiber bundle surface from fluffing in the step. The time period over which the fiber bundle passes through the two supporting members is preferably 3 seconds or less, more preferably 1 second or less, especially preferably 0.1 to 0.5 seconds. By using such a shortened treatment time, not only the processing speed is increased but also the occurrence of defects, e.g., fluffing, can be reduced.

It is preferable that the distance between the two supporting members during the pressing treatment is 50 to 500 mm. It is preferable that the pressing member is disposed at a position which is 25 to 400 mm downstream from the first pressing member and which is apart, perpendicularly upward or downward, from the plane that includes the fiber-bundle sliding contact surfaces of the first supporting member and second supporting member, at a distance of 10 to 100 mm therefrom. It is especially preferable that the supporting members and the pressing member(s) are disposed in a zigzag arrangement so that the adjacent supporting member and pressing member respectively come into contact with the upper surface and lower surface of the fiber bundle.

The materials of the supporting members and pressing member(s) are not particularly limited. However, from the standpoints of heat resistance and wear resistance, Teflon (registered trademark) and stainless steels, in particular, SUS316, are preferred. The surface roughness thereof is preferably in the range of 1.0 to 10.0 μm. In a case where the surface roughness thereof is outside the range, fiber breakage is prone to occur.

It is preferable that the carbon fiber bundle to be subjected to the pressing treatment has been heated beforehand. Although the carbon fiber bundle is subjected to a drying treatment before the pressing treatment, a preferred method is to conduct the pressing treatment while maintaining the temperature of the carbon fiber bundle which was elevated during the drying treatment. With respect to the temperature of the carbon fiber bundle which is in contact with the pressing member during the processing, the temperature thereof is preferably higher by 20 to 300° C. than the glass transition temperature of the resin component adherent to the carbon fiber bundle. In order to elevate the temperature of the fiber bundle during the processing, the supporting members and the pressing member may each independently be heated. Alternatively, supporting members and a pressing member which are disposed in a hollow-box-shaped heating chamber may be indirectly heated by heating the heating chamber. Alternatively, a pressing member may be heated by using these methods in combination.

It is also preferable that the temperature at which the carbon fiber bundle is treated on the pressing member is higher by 20 to 300° C. than the glass transition temperature of the resin component adherent to the fiber surface. The treatment temperature is more preferably higher by 40 to 200° C. than the glass transition temperature. In a case where the treatment temperature is too low, the shape of the curled fiber bundle tends not to be sufficiently straightened. Furthermore, there is a tendency that it is difficult to widen the fiber bundle. Meanwhile, in a case where the treatment temperature is too high, the resin component on the fiber surface tends to decompose.

In this pressing treatment, it is preferable that the width of the fiber bundle is increased. With respect to the degree of widening, the width of the widened fiber bundle is preferably 1.05 to 2.5 times the width of the fiber bundle which has just dried. It is more preferred that the fiber bundle is widened 1.1 to 2.0 times.

By using this device, the curled reinforcing-fiber bundle can be widened on the pressing member and heat-set, and a resin-sized flat reinforcing-fiber bundle can be obtained by heat-set of the fiber bundle. Specifically, it is preferable that in the strand which is before the first supporting member, the angle between the lines which connect the center of the cross-sectional arc to both end of the arc, respectively is 90 degrees or more and less than 160 degrees, and that after the strand passed through the final supporting member in the step, that angle is 160 degrees or more and less than 183 degrees.

The carbon fiber product of the invention is a carbon fiber product obtained by opening the carbon fiber bundle of the invention described above. According to the invention, a carbon fiber bundle which shows excellent adhesion to matrix resins is obtained, and the carbon fiber product is obtained preferably by opening and processing the carbon fiber bundle. As described above, the carbon fiber bundle of the invention has a feature wherein since a coating film of the sizing agent is formed on the surface of the carbon fibers, the sizing agent is less apt to shed from the carbon fiber bundle even when the carbon fiber bundle is opened. Namely, the invention involves a carbon fiber product obtained by opening the carbon fiber bundle.

Methods for opening the carbon fiber bundle are not particularly limited, and preferred examples thereof include a method in which the fibers are squeezed with a round rod, a method in which an air stream is used, and a method in which the fibers are vibrated with an ultrasonic wave or the like. The pressing treatment also is a method suitable for opening and widening the fiber bundle. Also preferred is a method in which a fluid such as air or the like is blown against the carbon fiber bundle to thereby open the fiber bundle. In this method of opening with the fluid, the degree of opening can be suitably controlled by regulating, for example, the pressure of the fluid such as air. Moreover, by blowing a fluid against the fiber bundle, the fiber bundle can be separated simultaneously. The resultant product is most suitable for random mats. The fibers to be subjected to these opening steps can be either continuous fibers or discontinuous fibers.

The carbon fiber product obtained using the carbon fiber bundle of the invention has a feature wherein the matrix resin to be composited is sufficiently impregnated and the carbon fiber product is a high-quality composite reduced in strength unevenness, or the like. Examples of such carbon fiber products include random mats preferably including discontinuous carbon fibers, uniaxially aligned carbon-fiber composite materials including continuous carbon fibers, and woven fabrics.

Especially preferred is a random mat including discontinuous fibers obtained by cutting the carbon fiber bundle of the invention. The term "random mat obtained using the carbon fiber bundle of the invention" means a random mat in which the carbon fibers are not aligned in any specific in-plane direction but arranged so as to be randomly and dispersedly oriented. In the random mat, the average fiber length of the carbon fibers is preferably 5 to 100 mm, more preferably 10 to 100 mm, even more preferably 15 to 100 mm. The average fiber length thereof is especially preferably 15 mm or more and 80 mm or less, most preferably 20 mm or more and 60 mm or less. Discontinuous fibers having such lengths may be used alone or in combination to form a random mat.

An especially preferred random mat is a random mat which is constituted by so as to include both the carbon fiber bundles of the invention which are opened and have a fiber length of 2 to 60 mm and a matrix resin and in which the carbon-fiber areal weight is 25 to 3,000 g/m$^2$ and the carbon fibers are substantially randomly oriented in in-plane directions.

As the matrix resin, a thermoplastic resin or a thermosetting resin is used.

The thermoplastic resin to be used is not particularly limited. Preferred examples thereof include polycarbonate resins, polyolefin resins, polyester resins, acrylic resins, polylactic acid, polyamide resins, ASA resins, ABS resins, polyetherketone resins, polyether imide resins, polyphenylene ether resins, polyphenylene oxide resins, polysulfone resins, polyethersulfone resins, polyetherimide resins, polyetheretherketone resins, polyphenylene sulfide resins, polyamide-imide resins, polyacetal resins, and compositions of two or more resins selected from these resins. Preferred of these are polyamide resins, polyester resins, polycarbonate resins, polyolefin resins, polyacetal resins, polysulfone resins, and the like.

The thermosetting resin to be used is also not particularly limited. Preferred examples thereof include epoxy resins, unsaturated polyester resins, phenolic resins, melamine resins, polyurethane resins, silicone resins, maleimide resins, cyanic acid ester resins, and a resin constituted by preliminary polymerization of a maleimide resin and a cyanic acid ester resin. Mixtures of these resins also can be used in the invention. Preferred of these are epoxy resins, phenolic resins, unsaturated polyester resins, and the like. In the case of using any of these thermosetting resins, the thermosetting resin may contain a hardener, a hardening accelerator, or the like.

Of the resins shown above, thermoplastic resins are preferred as the matrix resin to be used in the invention. In particular, polyamide resins are suitable from the standpoints of the mechanical properties of shaped products and forming cycle time. Preferred examples of the polyamide resins include nylon-6, nylon-66, nylon-610, nylon-11, nylon-12, copolymer nylon-6/66, copolymer nylon-6/610, copolymer nylon-6/11, and copolymer nylon-6/12. These polymers or copolymers may be used alone or as a mixture of two or more thereof.

It is also preferred to use such resins into which an inorganic filler is incorporated. Examples of the inorganic filler include talc, calcium silicate, wollastonite, montmorillonite, and various inorganic nanofillers. Furthermore, other additives which have conventionally been incorporated into polyamide compositions, such as a heat stabilizer, antistatic agent, weathering stabilizer, light stabilizer, aging inhibitor, antioxidant, softener, dispersant, filler, colorant, and lubricant, can be incorporated according to need.

It is preferable that the amount of the resin present in the random mat is 50 to 1,000 parts by weight per 100 parts by weight of the carbon fibers. The amount of the resin is more preferably 55 to 500 parts by weight per 100 parts by weight of the carbon fibers, and is even more preferably 60 to 300 parts by weight per 100 parts by weight of the carbon fibers.

It is preferable that in the random mat, the matrix resin is present in the form of fibers, a powder, or particles.

It is preferable that the random mat of the invention having such a configuration is manufactured, for example, through the following steps 1 to 3.

1. Step in which the carbon fiber bundles are cut;
2. Step in which the cut carbon fiber bundles are introduced into a tube and the carbon fiber bundles are opened;
3. Step in which a random mat is formed from the carbon fiber bundles and a matrix resin.

It is preferable that prior to the step of cutting (step 1.), the carbon fiber bundles are opened in preparation for widening. It is also preferable that in the opening step (step 2.), the carbon fiber bundles are opened and simultaneously separated, thereby obtaining a mass of carbon fiber bundles having a moderate width. By simultaneously conducting such separating, carbon fibers are more randomly arranged. Furthermore, for the step of forming a random mat (step 3.), use may be made of a method in which a random mat constituted only by carbon fiber bundles is formed beforehand and a matrix resin is impregnated thereinto later. It is preferable that the matrix resin is a thermoplastic resin. Also preferred is a method in which a random mat constituted only by carbon fibers and a film constituted by a thermoplastic resin are layered and molded by hot pressing.

In the case where a random mat is to be used as a base material for molding, it is preferable that this random mat is one in which the carbon fibers in the matrix resin have a controlled degree of opening. Namely, it is preferable that carbon fiber bundles are separated to obtain both carbon fiber bundles constituted by a specific number or more of carbon fibers and the other opened carbon fibers and that the random mat includes the carbon fiber bundles constituted by the specific number or more of carbon fibers in a specific ratio. Such a random can be obtained by regulating the cut length in step 1 and the set conditions for the opening step in step 2.

Use of the fiber bundle of the invention makes it possible to provide a random mat in which the carbon fibers show excellent adhesion to the matrix resin and the carbon fiber bundles has little shedding of the sizing agent therefrom even after the carbon fiber bundles are opened and which is suitable for various applications and purposes.

Also from the standpoint of satisfactorily obtaining a random mat, the shedding ratio of the sizing agent in the carbon fiber bundle of the invention is preferably 5% or less, more preferably 3% or less. By forming a random mat from the carbon fiber bundle having a proper shedding ratio of the sizing agent, the carbon fibers can be more closely in contact with the matrix resin and higher properties can be attained.

Still another aspect of the invention is a composite material which includes the carbon fiber bundle of the invention and a matrix resin. Examples of this composite material include the random mat such as described above and a uniaxially aligned carbon-fiber composite material described below. A preferred method for obtaining the composite material as a fiber-resin composite is to form, for example, a random mat described above and then press the formed random mat to obtain a composite constituted by carbon fiber bundles and the matrix resin. With respect to conditions for the pressing in this method, a cold press method is preferable, in which the random mat is heated beforehand to a temperature of the melting point or more of the matrix resin and the mold for pressing has a temperature lower than the melting point of the matrix resin.

Alternatively, the carbon fiber bundle of the invention is opened to produce a uniaxially aligned carbon-fiber composite material therefrom. More specifically, the uniaxially aligned carbon-fiber composite material can be obtained, for example, by the following method.

This uniaxially aligned carbon-fiber composite material constituted by carbon fiber bundles and a matrix resin composited therewith can be obtained by opening the carbon fiber bundles of the invention, arranging the opened fiber bundles in parallel, and bringing the arranged fiber bundles into contact with a molten thermoplastic resin. Preferred examples of the thermoplastic resin to be used here include the same thermoplastic resins as those shown above in the section of random mat. A preferred final fiber-resin composite is one constituted by layering a plurality of uniaxially aligned carbon-fiber composite material.

Manufacturing methods of the uniaxially aligned carbon-fiber composite material are not particularly limited, and the composite material can be obtained, for example, by the pultrusion method or the like. The pultrusion method is suitable for obtaining a composite material in which the carbon fibers are impregnated with a thermoplastic resin. In the case of a composite material in which impregnation with a matrix resin is reduced, i.e., in the case of a semi-impregnated layer, this composite material can be obtained, for example, by a method in which carbon fibers are unidirectionally arranged in parallel on a sheet of a matrix resin and this layered body is heated while pressing according to need.

It is preferable that the shape of the uniaxially aligned carbon-fiber composite material is cylindrical or prismatic. Carbon fiber bundles are set with a thermoplastic resin to obtain a strand, and this strand is cut. Thus, long-fiber pellets constituted by carbon fibers and the thermoplastic resin can be obtained. In the case of a pellet of a prismatic shape, the pellet can be formed into a sheet by reducing the height (thickness) thereof. The thickness of the resultant sheet-form composite material is preferably 40 to 3,000 μm.

The amount of the resin present in the uniaxially aligned carbon-fiber composite material is preferably 10 to 500 parts by weight, more preferably 20 to 250 parts by weight, per 100 parts by weight of the carbon fibers.

Such a carbon-fiber composite material obtained by compositing the carbon fiber bundle of the invention with a matrix resin is further subjected to pressing and the like, and thereby giving a fiber-resin composite which has few voids and has excellent properties. The porosity of this composite can be obtained by determining the degree of impregnation by an ultrasonic flaw detection method (C-scan).

Such an excellent composite is obtained because the presence of a resin on the fiber surface, which is due to the present invention, shows the effect of drawing the matrix resin to be impregnated thereafter (i.e., the effect of improving compatibility) and the amount of voids, as inner spots remaining unimpregnated, which is determined by the ultrasonic flaw detection method (C-scan) can be reduced, resulting in a high numerical value of impregnation.

Such a state of the carbon fiber bundle of the invention can be ascertained by observing the carbon fiber bundle with an electron microscope or the like. For example, with respect to the carbon fiber bundle of the invention, the state in which a sizing agent is adherent to the surface of the carbon fibers can be ascertained by observing the surface with an electron microscope operated at a low accelerating voltage, and the state in which the sizing agent is fusion-bonded to between carbon fibers can be ascertained using the same technique. The effect of improving impregnation property with the matrix resin is obtained due to the presence of the sizing agent on the surface of the carbon fibers, and the remarkable effect of improving the bundling properties of the carbon fiber bundle is obtained due to the fusion-bonded state of the sizing agent present between the carbon fibers.

EXAMPLES

Examples are shown below, but the invention should not be construed as being limited to the following Examples. Evaluation was made by the following methods.

(1) Measurement of Melting Point of Polyamide Resin

A measurement was made using a differential scanning calorimeter (DSC) ("Diamond DSC", manufactured by Perkin Elmer K.K.) under the conditions of a heating rate of 10° C./min, and the detected endothermic peak due to crystal fusion was taken as the melting point.

(2) Measurement of Glass Transition Temperature of Polyamide Resin

The water was removed from an aqueous dispersion with a 120° C. hot-air drying oven, and the polyamide was evaluated for glass transition temperature with a DSC apparatus ("DSC 7020", manufactured by Seiko Instruments Inc.).

(3) Measurement of Particle Diameters of Polyamide Resin

A particle diameter measurement was conducted with a laser diffraction type particle size distribution analyzer (laser diffractionscattering type particle size distribution analyzer "LA-950", manufactured by Horiba Ltd.). A sample which had been treated with an ultrasonic wave for 3 minutes was used. Values of $D_{10}$ (10%-cumulative particle diameter), $D_{50}$ (50%-cumulative particle diameter), and $D_{90}$ (90%-cumulative particle diameter) were determined as particle diameters. The value of $D_{50}$ was employed as the average particle diameter.

(4) Adhesion Ratio of Sizing Agent

About 5 g of carbon fibers to which a sizing agent has been adhered are gathered and introduced into a vessel made of heat-resistant glass. Subsequently, this vessel is dried at 120° C. for 3 hours, cooled to room temperature while taking care to prevent moisture absorption, and then weighed. This value is expressed by $W_1$ (g).

Next, the vessel, together with the carbon fibers placed therein, is heated in a nitrogen atmosphere at 500° C. for 10 minutes, thereafter cooled to room temperature while taking care to prevent moisture absorption, and weighed. This value is expressed by $W_2$ (g).

After the treatment shown above, the amount of the adherent compound is determined using the following equation.

$$\text{Adhesion ratio of sizing agent} = (W_1 - W_2)W_2(\%) \quad (2)$$

Seven samples taken from the same bundle were examined, and an average therefor was taken as the adhesion ratio of the sizing agent.

(5) Evaluation of Shedding ratio of Sizing Agent and Degree of Opening of Carbon Fiber Bundle A carbon fiber bundle was cut into lengths of 5 mm, 20 mm, and 100 mm using a rotary cutter. The cut fiber bundles having the respective lengths were introduced into a trumpet-shaped tapered tube such as that shown in FIG. 1. In this trumpet-shaped tapered tube, the carbon fiber introduction port had a diameter of 20 mm, the discharge port had a diameter of 55 mm, and the tube length in terms of the distance from the introduction port to the discharge port was 400 mm. The tube had several holes of 1 mm formed in the wall. At the time when the carbon fiber bundles were introduced into the tapered tube, compressed air was passed therethrough so that the pressure of the compressed air just before the tapered tube was 0.25 MPa. The resultant difference in weight between before and after the blowing of compressed air was determined.

The shedding ratio of the sizing agent from the carbon fiber bundles was calculated using the following equation (3).

$$\text{Shedding ratio of sizing agent } (x) = [(\text{adhesion ratio of sizing agent before blowing}) - (\text{adhesion ratio of sizing agent after blowing})]/(\text{adhesion ratio of sizing agent before blowing}) \times 100(\%) \quad (3)$$

The larger the value of the shedding ratio (x) is, the higher the shedding ratio of the sizing agent after opening is.

The adhesion ratio of the sizing agent before the blowing and that after the blowing were determined by the method (4) shown above.

With respect to the degree of opening of carbon fiber bundles, the carbon fiber bundles cut into 20 mm were used and compressed air was blown thereagainst. Thereafter, the degree of opening was evaluated in terms of the ratio by weight of fiber bundles having a width less than 0.6 mm in all the fibers.

(6) Evaluation of State of Adhesion and Thickness of Resin on Carbon Fiber Bundle Surface An adhesive sheet of graphite was applied at a pressure of 0.1 MPa to each of both surfaces of a carbon fiber bundle to which a resin had adhered. Thereafter, one of the adhesive sheets was peeled off, and the surface of the carbon fiber bundle which had transferred to the peeled adhesive sheet was observed with a scanning electron microscope ("AURIGA FIB-SEM", manufactured by SII Nano Technology Inc.) under the conditions of an accelerating voltage of 200 V and a magnification of 3,000 diameters. Under the same conditions, ten fields of view (the number of monofilaments per view was 5) were randomly photographed to examine 50 monofilaments. Thus, the monofilaments were examined for resin lumps having a thickness of 10 nm or more. The resin lumps were classified into resin lumps (A) having a length less than 10 μm, resin lumps (C) present along fine concaves and convexes of the fiber surface, and rod-shaped connecting resin lumps (D) present between fibers. Furthermore, five fields of view of the same sample (the number of monofilaments per view was 10) were photographed under the conditions of an accelerating voltage of 200 V and a magnification of 1,000 diameters. The sample was thus examined for the presence of a resin coating (B) having a thickness less than 10 nm.

Moreover, with respect to each kind of adherent resin, three portions where the resin was adherent were processed with the FIB device (focused ion beam device) as an accessory to the apparatus to produce filament fracture sections. The rupture sections obtained were observed at a magnification of 70,000 diameters, and an average thereof was taken as resin thickness.

(7) Evaluation of State of Adhesion of Sizing Agent Inside and Outside the Carbon Fiber Bundle A carbon fiber bundle to which a resin was adherent was irradiated using a mercury lamp as a light source in order to cause the resin component in the sizing agent to fluoresce, and the surface of the carbon fiber bundle having an adherent resin was observed with a fluorescence microscope by means of a dispersion type X-ray analyzer ("Energy EMAX ENERGY EX-450", manufactured by Horiba Ltd.).

Next, in order to ascertain the state of adhesion within the carbon fiber bundle, the following examination was conducted. An adhesive sheet of graphite was applied at a pressure of 0.1 MPa to each of both surfaces of the carbon fiber bundle. Thereafter, one of the adhesive sheets was peeled off, and the surface (inner surface) of the carbon fibers which had transferred to the peeled adhesive sheet was observed with a fluorescence microscope. This operation was repeated three times and the fluorescent images attributable to the resin were compared. Thus, the state of adhesion of the sizing agent inside the carbon fiber bundle was ascertained. Incidentally, a thickness of 20 μm was removed per operation by the adhesive sheet, and the state of the inner part extending to a depth of 60 μm from the surface of the fiber bundle was examined through the three operations.

(8) Viscosity of Polyamide Resin

The melt viscosity of polyamide resin particles to be used as a sizing agent was measured with a capillary rheometer ("CAPILOGRAPH 1D", manufactured by Toyo Seiki Seisaku-Sho, Ltd.). The melt viscosity thereof was measured at the temperature at which the excess water and solvent were removed from the treating liquid (emulsion) and at a shear rate of 6 s$^{-1}$.

(9) Evaluation of Degree of Bundling (Handle) of Carbon Fiber Bundle

The degree of bundling (handle) of a carbon fiber bundle was measured with a Handle-O-Meter ("HOM-200", manufactured by Daiei Kagaku Seiki Mfg.) in accordance with JIS L-1096 method E (Handle-O-Meter method). The specimens to be subjected to the handle measurement had a length of 10 cm, and the width thereof had been regulated by widening the reinforcing-fiber bundle so that a width of 1 mm was accounted for by 2,400 filaments. The width of the slit was set at 10 mm. One reinforcing-fiber bundle as a specimen was placed on the test table having the slit groove formed therein. The specimen was pushed into the groove to a given depth (8 mm) with a blade, and the resultant resistance force (g) was measured. The handle of the reinforcing-fiber bundle was obtained from an average value for three measurements.

(10) Evaluation of Rounding of Carbon Fiber Bundle Strand (1)

With respect to the rounding of a strand, the strand was visually evaluated during the period from after sizing agent drying to the winding step (just before the winder), while paying attention to "the state of rounding of the fiber bundle", "ease of winding-up", and "occurrence of breakage of fiber bundle end during winding-up".

(11) Evaluation of Rounding of Carbon Fiber Bundle Strand (2) (Strand Curl Value)

The degree of strand rounding that occurs when a fiber bundle in which the adherent sizing agent has been dried is subjected again to contact heating was evaluated in terms of a strand curl value. Namely, samples having a length of 10 cm were cut out of the strand which has just been dried, for example, which is before the first supporting member, and of the strand which has just undergone contact treatment, for example, which has passed through the last supporting member. The cross-sectional shape of each fiber bundle strand was observed with a microscope ("SMZ 1000", manufactured by Nikon Corp.) equipped with an image analysis software. The center of the arc was connected to each of the two ends of the arc with a straight line, and the angle between the two straight lines was measured and taken as strand curl value.

(12) Method for Measuring Tensile Shear Strength Using Carbon Fiber Bundle

Two carbon fiber bundles having a length of 53 mm were prepared from a sized carbon fiber bundle. A polyamide film (nylon-6 resin film; manufactured by Unichika, Ltd.; "EMBLEM ON-25"; melting point, 220° C.; thickness, 25 μm) having a length of 3 mm was sandwiched between the two flat carbon fiber bundles and bonded thereto by heating at a temperature of 260° C. for 2 minutes and 30 seconds so that the bonded portion had a length of 3 mm.

Figure 2:
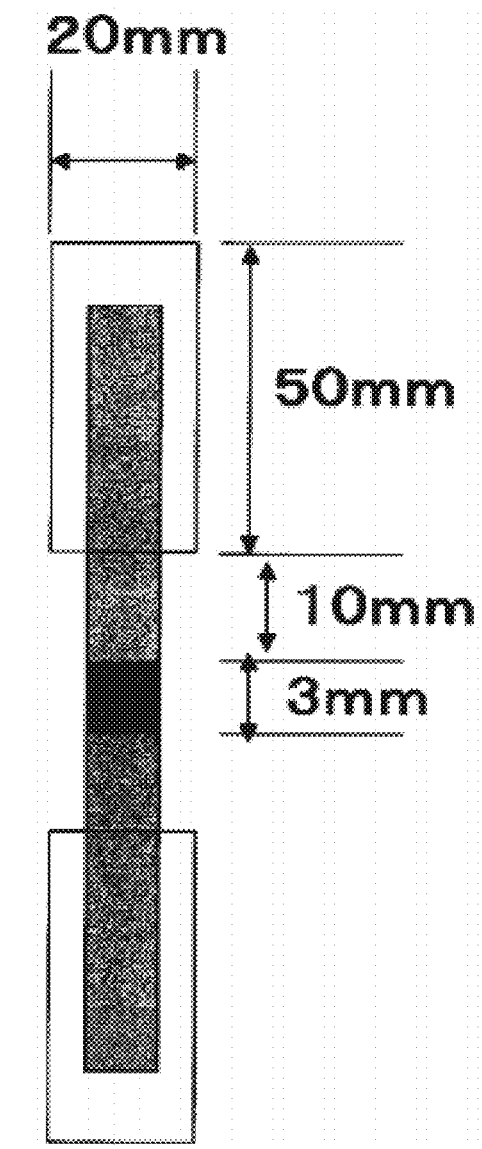
FIG. 2 is a view for explaining a method for measuring tensile shear strength.

Each of both ends of this specimen formed from two fiber bundles was sandwiched between two sheets of sand paper having a length of 50 mm and a grain size of #320, thereby giving anti-slip processing (FIG. 2). This sample was examined as a final specimen. The portions to which the anti-slip processing had been given were held by chucks, and a tensile shear strength measurement was made using Autograph (AGS-X 5 kN, manufactured by Shimadzu Corp.) in accordance with JIS K6850. The test speed was set at 3 mm/min, and load was imposed to measure a tensile strength. Seven specimens were tested, and an average value therefor was taken as tensile shear strength.

(13) Fiber Volume Fraction (Vf) of Composite

The density in water of a carbon fiber/resin composite cut into a 15-mm square was measured. Subsequently, this composite was put in an aluminum crucible, and this crucible was placed for 30 minutes in a muffle furnace heated at 550° C. to decompose the matrix resin. The weight was measured before and after the decomposition, thereby determining the fiber volume fraction.

(14) Degree of Impregnation in Composite Determined by Ultrasonic Flaw Detection Method (C-Scan)

A measuring apparatus based on the ultrasonic flaw detection method ("SDS-WIN", manufactured by Krautkramer Japan Co., Ltd.) was used to examine molded plates according to the invention. An ultrasonic wave of 34 dB was used for a uniaxially aligned carbon fiber composite, and an ultrasonic wave of 35.5 dB was used for a random mat. From the two-dimensional mapping image obtained, the ratio of sections where impregnation had occurred in at least 70% of the previous surface area was determined. This ratio was taken as the degree of impregnation.

(15) Method for Examining Flexural Properties of Composite

A specimen having a width of 15 mm and a length of 100 mm was cut out of a composite, and evaluated by the three-point bending with central loading in accordance with JIS K7074. The specimen was placed on supports which had a radius of 2 mm and which had been disposed so that the support-to-support distance was 80 mm. Load was imposed thereon at the center of the area between the supports with a loading nose having a radius of 5 mm at a test speed of 5 mm/min, and the resultant maximum load and the amount of deflection at the center were measured to determine the flexural strength and flexural modulus.

Example 1

Into a 70-L autoclave were introduced 11 kg of ε-caprolactam, 8 kg of a 50% aqueous solution of hexamethyleneammonium adipate, and 10 kg of aminododecanoic acid. After the atmosphere in the polymerizer was replaced with nitrogen, the polymerizer was closed and heated to 180° C. Subsequently, the internal temperature of the polymerizer was elevated to 240° C. while regulating the internal pressure of the polymerizer to 17.5 kgf/cm$^2$ while being stirred. After 2 hours had passed since the polymerization temperature had reached 240° C., the internal pressure of the polymerizer was released and returned to ordinary pressure over about 2 hours. After the pressure release, the contents were polymerized for 1 hour in a nitrogen stream and then polymerized for 2 hours at a reduced pressure. Nitrogen was introduced to return the internal pressure to ordinary pressure. Thereafter, the stirrer was stopped, and the contents were discharged as a strand and pelletized. Unreacted monomers were extracted and removed therefrom using boiling water, and the pellets were dried to obtain terpolymer polyamide particles. The copolymerization ratio in this terpolymer was nylon-6/nylon-66/nylon-12 (weight ratio; 45/15/40 wt %). The particle diameter $D_{50}$ thereof was 0.4 μm (particle diameters $D_{10}/D_{50}/D_{90}$=0.12 μm/0.4 μm/0.45 μm), and the melting point thereof was 140° C.

Into an autoclave equipped with a stirrer were introduced 120 g of the nylon-6/66/12 terpolymer polyamide resin thus obtained, 179.6 g of water, and 0.4 g of sodium hydroxide. While kept being stirred at a rotation speed of 500 rpm, the contents were heated to 150° C. and reacted for 30 minutes at 150° C. After completion of the reaction, the contents as such were cooled to 50° C., and an aqueous dispersion of a polyamide resin was taken out. The aqueous polyamide resin dispersion obtained had a resin concentration of 40 parts by weight per 100 parts by weight of the aqueous dispersion.

Finally, 75 g of the aqueous polyamide resin dispersion obtained was mixed with 12.0 g of an aqueous solution of an ammonium salt of an ethylene/acrylic acid copolymer (registered trademark PRIMACOR 59801, manufactured by The Dow Chemical Co.; acrylic acid modification amount, 20% by weight) (degree of neutralization with ammonia, 0.75), the aqueous solution having been separately prepared so as to have a concentration of 25% by weight. Thus, an aqueous dispersion of a polyamide resin composition was obtained. This aqueous dispersion contains the ethylene/acrylic acid copolymer in an amount of 10 parts by weight per 100 parts by weight of the polyamide resin component. Hereinafter, this dispersion is referred to as aqueous dispersion (a1) containing a fine-particle component.

This dispersion was mixed, with stirring, with water so that the amount of the copolyamide was 100 parts by weight per 4,000 parts of the water, thereby preparing a sizing liquid (emulsion solution of sizing agent).

This terpolymer polyamide was taken out by removing the water from the aqueous dispersion with a 120° C. hot-air drying oven. The glass transition temperature of this terpolymer polyamide was measured and, as a result, was found to be 32° C.

In a bath of this sizing liquid was continuously immersed an unsized carbon fiber strand (registered trademark "Tenax STS-24K N00", manufactured by Toho Tenax Co., Ltd.; diameter 7 μm×24,000 filaments; fineness, 1.6 g/m; tensile strength, 4,000 MPa (408 kgf/mm$^2$); tensile modulus, 238 GPa (24.3 ton/mm$^2$)). Thus, the emulsion was impregnated into interstices among the filaments. This strand was dried by passing the strand through a 120 to 150° C. drying oven over about 120 seconds, thereby obtaining a carbon fiber bundle having a width of 10 mm and a thickness of 0.162 mm.

The amount of the adherent sizing agent in the carbon fiber bundle obtained was 1.2 parts by weight per 100 parts by weight of the carbon fibers. This fiber bundle had a large value of handle, but had rounded slightly.

A resin coating (B) having a thickness of 4 nm covered 97% of the surface of the carbon fibers obtained. Furthermore, resin lumps (A) having a thickness of 152 nm, average major-axis length of 1,150 nm, and average minor-axis length of 800 nm were randomly present on the fibers to form a pattern of blotches as in the giraffe. Within a field of view of 900 μm$^2$ in an observation with an electron microscope, 108 such resin lumps (A) were observed. Furthermore, resin lumps (C) were simultaneously observed within fine concaves and convexes of the fiber surface; these resin lumps were continuous along the fiber axis direction and had a width of 75 nm and a thickness of 45 nm.

Meanwhile, connecting resin lumps (D) were observed between the carbon fibers constituting the carbon fiber bundle. These resin lumps were continuous along the fiber axis direction and had a length of 10 μm or more and an average thickness of 615 nm. Fifty single fibers were examined and, as a result, such connecting resin lumps (D) were observed at 18 positions.

Properties thereof including tensile shear strength and the shedding ratio of the sizing agent from the carbon fiber bundle upon compressed-air blowing were determined and shown in Table 1. The carbon fiber bundle had a high tensile shear strength and a low shedding ratio of the sizing agent.

Example 2

Composite Material (Random Mat)

Fiber bundles obtained by cutting the carbon fiber bundle obtained in Example 1 into a length of 20 mm and a polyamide resin powder (nylon-6 resin powder "A1030FP", manufactured by Unichika, Ltd.) as a matrix resin were prepared. The carbon fibers and the polyamide resin powder were introduced into a tapered tube at set feed rates of 600 g/min and 730 g/min, respectively.

While air was being blown against the carbon fibers within the tapered tube to partly open the fiber bundles, the carbon fibers were sprayed, together with the polyamide resin powder, on a table disposed under the outlet of the tapered tube. The carbon fibers and polyamide resin powder sprayed were sucked with a blower from under the table and fixed. Thus, a carbon-fiber random mat (composite material) having a thickness of 5 mm was obtained.

The carbon-fiber random mat obtained was heated with a pressing device heated at 260° C., for 5 minutes at 3 MPa to obtain a molded plate (composite) of the carbon-fiber random mat composite material, the molded plate having a total fiber-and-resin areal weight of 2,700 g/m$^2$, a thickness of 2.0 mm, and a fiber volume fraction of 35 vol %. The molded plate obtained had no unimpregnated spots therein, and had flexural properties including a flexural strength of 445 MPa and a flexural modulus of 24 GPa.

Example 3

A terpolymer polyamide was obtained in the same manner as in Example 1, except that the hexamethyleneammonium adipate in Example 1 was replaced with ω-aminoundecanoic acid and that ε-caprolactam, ω-aminoundecanoic acid, and aminododecanoic acid were introduced into a 70-L autoclave in amounts of 15 kg, 15 kg, and kg, respectively. The copolymerization ratio in this terpolymer was nylon-6/nylon-11/nylon-12 (weight ratio; 30/30/40 wt %), and the melting point thereof was 115° C.

Using the nylon-6/11/12 terpolymer polyamide resin thus obtained, an aqueous dispersion of a polyamide resin composition was obtained in the same manner as in Example 1. Hereinafter, this dispersion is referred to as aqueous dispersion (a2) containing a fine-particle component. A sizing liquid (emulsion solution of sizing agent) was prepared in the same manner as in Example 1.

This terpolymer polyamide was taken out by removing the water from the aqueous dispersion with a 120° C. hot-air drying oven. The glass transition temperature of this terpolymer polyamide was measured and, as a result, was found to be 28° C. Furthermore, the polyamide particles were examined for particle diameter. As a result, the 50%-cumulative particle diameter ($D_{50}$) thereof was found to be 0.57 μm.

Next, an uncut and unsized reinforcing-fiber bundle was continuously immersed in a bath of the sizing liquid (emulsion) to diffuse the treating liquid into interstices among the monofilaments of the fiber bundle. This fiber bundle was dried by passing the bundle through a 120-150° C. drying oven over 120 seconds, thereby obtaining a reinforcing-fiber bundle having a width of about 9.9 mm. The thermoplastic resin particles which had adhered to the carbon fibers had a melt viscosity of 2,304 Pa·s at 150° C. and a shear rate of 6 s$^{-1}$.

The amount of the adherent sizing agent in the reinforcing-fiber bundle obtained was 1.0 part by weight per 100 parts by weight of the reinforcing fibers, and the reinforcing-fiber bundle had a handle of 120 g.

A resin coating (B) having a thickness of 4 nm covered 98% of the surface of the carbon fibers obtained. Furthermore, resin lumps (A) having a thickness of 154 nm, average major-axis length of 1,210 nm, and average minor-axis length of 820 nm were randomly present on the fibers to form a pattern of blotches as in the giraffe. Within a field of view of 900 μm$^2$ in an observation with an electron microscope, 92 such resin lumps (A) were observed. Furthermore, resin lumps (C) were simultaneously observed within fine concaves and convexes of the fiber surface; these resin lumps were continuous along the fiber axis direction and had a width of 70 nm and a thickness of 50 nm.

Meanwhile, connecting resin lumps (D) were observed between the carbon fibers constituting the carbon fiber bundle. These resin lumps were continuous along the fiber axis direction and had a length of 10 μm or more and an average thickness of 648 nm. Fifty single fibers were examined and, as a result, such connecting resin lumps (D) were observed at 21 positions.

After the sized carbon fiber bundle was obtained in the same manner as in Example 1, the carbon fiber bundle was examined for adhesion amount, tensile shear strength, and the shedding ratio. As a result, the carbon fiber bundle had a high tensile shear strength and a low degree of sizing agent shedding as shown in Table 1.

Example 4

Composite Material (Random Mat)

A random mat (composite material) was obtained in the same manner as in Example 2, except that the carbon fiber bundle of Example 3 was used. The carbon-fiber random mat obtained was heated with a pressing device heated at 260° C., for 5 minutes at 3 MPa to obtain a molded plate (composite) of the carbon-fiber random mat composite material, the molded plate having a total fiber-and-resin areal weight of 2,700 g/m², a thickness of 2.0 mm, and a fiber volume fraction of 35 vol %. The molded plate obtained had no unimpregnated spots therein, and had flexural properties including a flexural strength of 420 MPa and a flexural modulus of 24 GPa.

Example 5

A terpolymer polyamide was obtained in the same manner as in Example 1, except that the ε-caprolactam in Example 1 was replaced with w-aminoundecanoic acid and that 50% aqueous hexamethyleneammonium adipate solution, w-aminoundecanoic acid, and aminododecanoic acid were introduced into a 70-L autoclave in amounts of 30 kg, 15 kg, and kg, respectively. The copolymerization ratio in this terpolymer was nylon-66/nylon-11/nylon-12=30/30/40 (weight ratio), and the melting point thereof was 105° C. Using the nylon-66/11/12 terpolymer polyamide resin thus obtained, an aqueous dispersion of a polyamide resin composition was obtained in the same manner as in Example 1.

A sized carbon fiber bundle was obtained in the same manner as in Example 1, and was then examined for adhesion amount, tensile shear strength, and the shedding ratio. As a result, the carbon fiber bundle had a high tensile shear strength and a low degree of sizing agent shedding as shown in Table 1.

Example 6

Composite Material (Random Mat)

A random mat (composite material) was obtained in the same manner as in Example 2, except that the carbon fiber bundle of Example 5 was used. This random mat was pressed to obtain a molded plate (composite) of the carbon-fiber random mat composite material. The molded plate obtained had no unimpregnated spots therein, and had flexural properties including a flexural strength of 427 MPa and a flexural modulus of 25 GPa.

Example 7

An aqueous dispersion of the terpolymer polyamide obtained in Example 1 was prepared without using the aqueous solution of an ammonium salt of an ethylene/acrylic acid copolymer which had a concentration regulated to 25% by weight, and a sized carbon fiber bundle was obtained in the same manner as in Example 1. Thereafter, the carbon fiber bundle was examined for adhesion amount, tensile shear strength, and the degree of sizing agent shedding. As a result, the carbon fiber bundle had a high tensile shear strength and a low degree of sizing agent shedding as shown in Table 1.

Example 8

Composite Material (Random Mat)

A random mat (composite material) was obtained in the same manner as in Example 2, except that the carbon fiber bundle of Example 7 was used. This random mat was pressed to obtain a molded plate (composite) of the carbon-fiber random mat composite material. The molded plate obtained had no unimpregnated spots therein, and had flexural properties including a flexural strength of 415 MPa and a flexural modulus of 24 GPa.

Comparative Example 1

A bipolymer polyamide was obtained in the same manner as in Example 1, except that the aminododecanoic acid in Example 1 was omitted and that ε-caprolactam and 50% aqueous hexamethyleneammonium adipate solution were introduced into a 70-L autoclave in amounts of 17.5 kg and 6 kg, respectively.

The copolymerization ratio in this polyamide was nylon-6/nylon-66=85/15 (weight ratio), and the melting point thereof was 200° C.

An aqueous dispersion of a polyamide resin composition was obtained in the same manner as in Example 1, except that the nylon-6/66 bipolymer polyamide resin thus obtained was used and that the temperature of the autoclave equipped with a stirrer was set at 240° C.

A sized carbon fiber bundle was obtained in the same manner as in Example 1, and was then examined for adhesion amount, tensile shear strength, and the shedding ratio. As a result, the carbon fiber bundle had a low tensile shear strength and a high degree of sizing agent shedding as shown in Table 1.

Comparative Example 2

Composite Material (Random Mat)

A random mat was obtained in the same manner as in Example 2, except that the carbon fiber bundle of Comparative Example 1 was used. This random mat was pressed to obtain a molded plate of the carbon-fiber random mat composite material. The molded plate obtained had unimpregnated spots therein, and had flexural properties including a flexural strength of 390 MPa and a flexural modulus of 24 GPa.

Comparative Example 3

A bipolymer polyamide was obtained in the same manner as in Example 1, except that the hexamethyleneammonium adipate in Example 1 was omitted and that ε-caprolactam, aminododecanoic acid, and pure water were introduced into a 70-L autoclave in amounts of 16.5 kg, 4 kg, and 2 L, respectively. The copolymerization ratio in this polyamide was nylon-6/nylon-12=80/20 (weight ratio), and the melting point thereof was 188° C.

An aqueous dispersion of a polyamide resin composition was obtained in the same manner as in Example 1, except that the nylon-612 bipolymer polyamide resin thus obtained was used and that the temperature of the autoclave equipped with a stirrer was set at 240° C.

A sized carbon fiber bundle was obtained in the same manner as in Example 1, and was then examined for adhesion amount, tensile shear strength, and the shedding ratio. As a result, the carbon fiber bundle had a low tensile shear strength and a high degree of sizing agent shedding as shown in Table 1.

Comparative Example 4

Composite Material (Random Mat)

A random mat was obtained in the same manner as in Example 2, except that the carbon fiber bundle of Comparative Example 3 was used. This random mat was pressed to obtain a molded plate of the carbon-fiber random mat composite material. The molded plate obtained had unimpregnated spots therein, and had flexural properties including a flexural strength of 400 MPa and a flexural modulus of 23 GPa.

Example 9

Composite Material (Random Mat)

A random mat was obtained in the same manner as in Example 2, except that the carbon fiber bundle of Example 1 was used and this carbon fiber bundle was cut into 5 mm. This random mat was pressed to obtain a molded plate of the carbon-fiber random mat composite material. The molded plate obtained had unimpregnated spots therein only slightly, and had flexural properties including a flexural strength of 430 MPa and a flexural modulus of 23 GPa.

Example 10

Composite Material (Random Mat)

A random mat (composite material) was obtained in the same manner as in Example 2, except that the carbon fiber bundle of Example 1 was used and this carbon fiber bundle was cut into 100 mm. This random mat was pressed to obtain a molded plate (composite) of the carbon-fiber random mat composite material. The molded plate obtained had unimpregnated spots therein only slightly, and had flexural properties including a flexural strength of 420 MPa and a flexural modulus of 22 GPa.

Example 11

Composite (Uniaxially Aligned Carbon Fiber Composite)

The carbon fiber bundles obtained in Example 1 were disposed in parallel along one direction while squeezing the bundles with a round rod, thereby arranging the bundles into a sheet form. A polyamide-6 film (a 30 μm-thick film formed from "EMBLEM", manufactured by Unichika, Ltd.) was placed on each of the upper and lower surfaces of the sheet so that the amount of the polyamide-6 resin was 100 parts by volume per 100 parts by volume of the carbon fibers. This stack was pressed at a pressure of 2.5 MPa with a 260° C. hot press to obtain a uniaxially aligned carbon-fiber composite material sheet. The uniaxially aligned carbon-fiber composite material sheet had a carbon-fiber areal weight of 100 g/m$^2$ and a carbon-fiber fraction of 50 vol %.

A cross-section of the sheet was observed with a microscope. As a result, the sheet had no spots unimpregnated with the polyamide-6 resin. Eighteen sheets which each were the uniaxially aligned carbon-fiber composite material sheet were stacked so as to be aligned in one direction, and heated at 3.0 MPa for 15 minutes with a pressing device heated at 260° C., thereby obtaining a molded plate (uniaxially aligned carbon fiber composite) having a thickness of 2.0 mm.

The molded plate obtained had uniaxial-direction flexural properties including a flexural strength of 1,250 MPa and a flexural modulus of 100 GPa.

TABLE 1

|  | Ex. 1 | Ex. 3 | Ex. 5 | Ex. 7 | Comp. Ex. 1 | Comp. Ex. 1 |
|---|---|---|---|---|---|---|
| Components of copolyamide |  |  |  |  |  |  |
| Component (A) (PA11, or the like.), parts | 40 | 70 | 70 | 40 | — | 20 |
| Component (B) (PA66), parts | 15 | — | 30 | 15 | 15 | — |
| Component (C) (PA6), parts | 45 | 30 | — | 45 | 85 | 80 |
| Melting point, ° C. | 140 | 115 | 105 | 140 | 200 | 188 |
| Presence or absence of ethylene/acrylic acid copolymer | present | present | present | absent | present | present |
| Width of carbon fiber bundle, mm | 10.0 | 9.9 | 10.2 | 10.1 | 9.8 | 10.4 |
| Thickness of carbon fiber bundle, mm | 0.162 | 0.163 | 0.157 | 0.159 | 0.165 | 0.155 |
| Amount of adherent sizing agent, wt % | 1.2 | 1.2 | 1.3 | 1.2 | 1.3 | 1.4 |
| Tensile shear strength, MPa | 52 | 53 | 55 | 44 | 40 | 38 |
| Shedding ratio of sizing agent, % For fiber lengths 5/20/100 mm | 3/4/2 | 3/3/4 | 2/3/3 | 4/5/5 | 45/47/50 | 51/50/54 |
| Random mat composite | Ex. 2 | Ex. 4 | Ex. 6 | Ex. 8 | Comp. Ex. 2 | Comp. Ex. 4 |
| Flexural strength, MPa | 445 | 420 | 427 | 415 | 390 | 400 |
| Flexural modulus, GPa | 24 | 24 | 25 | 24 | 24 | 23 |

Example 12

Terpolymer polyamide particles constituted of nylon-6/nylon-66/nylon-12 (weight ratio; 45/15/40 wt %) were obtained in the same manner as in Example 1. The polyamide particles had a particle diameter $D_{50}$ of 0.4 μm, a melting point of 140° C., and a glass transition temperature of 32° C. An aqueous dispersion (a1) containing a polyamide resin composition was produced therefrom in the same manner as in Example 1.

Subsequently, 11,820 g of water and 5 g of a polyoxyethylene alkyl ether surfactant (polyoxyethylene lauryl ether "Emulgen 103", manufactured by Kao Corp.), a nonionic surfactant which is liquid at 20° C., were added to 300 g of the aqueous polyamide resin dispersion (concentration, 40% by weight) with stirring at room temperature. Thus, a sizing liquid containing polyamide particles dispersed therein (emulsion; surfactant concentration, 0.04% by weight) was obtained.

This sizing liquid was impregnated into an unsized carbon fiber bundle ("Tenax STS-24K N00", manufactured by Toho Tenax Co., Ltd.) to adhere the nylon-6/nylon-66/nylon-12 terpolymer polyamide resin thereto.

The fiber bundle obtained was passed through a 180° C. drying oven over 120 seconds to dry the fiber bundle.

Just under the outlet of the dryer, the cross-section of this fiber bundle which was perpendicular to the fiber axis direction had been curled in the shape of the letter C. The degree of curling was evaluated in terms of the angle between the two lines which connected the center of the arc to both ends of the arc. As a result, the angle was 130 degrees. Furthermore, the curled carbon fiber bundle was made flat on a flat plate, and the width of this fiber bundle was measured and was found to be 8 mm. Moreover, the handle of the fiber bundle was measured and, as a result, was found to be 134 g. This fiber bundle was slightly unable to retain a flat state, and was in the state of being prone to round into a rod.

This fiber bundle was successively subjected to a treatment with a three-roll device. This three-roll device includes a first supporting member (first roll) and a second supporting member (third roll) which have been disposed at positions apart from the outlet of the drying oven at distances of 10 cm and 25 cm, respectively, therefrom and a pressing member (second roll) disposed at a position which lies midway between the first supporting member and the second supporting member and which is 2 cm apart downward from the plane that includes both the fiber-bundle sliding contact surface of the first supporting member and the fiber-bundle sliding contact surface of the second supporting member. The supporting members are in contact with the lower surface of the fiber bundle, and the pressing member is in contact with the upper surface thereof.

The fiber bundle which had come out from the outlet of the dryer was consecutively passed through this three-roll device and then wound up with a winder. Incidentally, the material of the supporting members and pressing member was SUS316, and these members used were each in the form of a fixed rod having a diameter of 1 cm. The surface temperature of the strand which was passing through the midway pressing member was measured, and was found to be 95° C., which was higher by 63° C. than the glass transition temperature of the resin component of the sizing agent, i.e., 32° C. The carbon fiber bundle passed from the first supporting member to the second supporting member over about 0.9 seconds. The resin-sized reinforcing fiber bundle which had passed through the second supporting member had neither warpage nor folding along the fiber axis direction, and the width of the fiber bundle had increased to 11 mm (1.38 times the width thereof before the contact heating). In the cross-section of the strand, the angle between the two lines connecting the center of the arc to both ends of the arc was 180 degrees. The amount of the adherent resin in the resin-sized reinforcing fiber bundle obtained was 0.46 wt %. Furthermore, the surface and inner surfaces of the resin-sized reinforcing fiber bundle were observed with a fluorescence microscope. As a result, it was found that the resin was adherent in a large amount to the surface of the surface layer of the fiber bundle and the adherent-resin amount decreased toward the inside.

This resin-sized carbon fiber bundle was examined for the degree of opening. As a result, a degree of opening as high as 58% was obtained.

Example 13

Composite Material (Random Mat)

The 11-mm carbon fiber bundle of Example 12, which showed a degree of opening as high as 58%, and a thermoplastic resin (nylon-6 resin powder "A1030FP", manufactured by Unichika, Ltd.) as a matrix resin were prepared, and a random mat (composite material) was obtained in the same manner as in Example 2. This random mat was pressed to obtain a molded plate (composite) of the random-mat composite material, the molded plate having a total fiber-and-resin areal weight of 2,700 g/m$^2$, a thickness of 2.0 mm, and a fiber volume fraction of 35 vol %. The composite obtained had no unimpregnated spots, and showed highly excellent flexural properties including a flexural strength of 483 MPa and a flexural modulus of 25 GPa.

Example 14

Terpolymer polyamide particles constituted of nylon-6/nylon-11/nylon-12 (weight ratio; 30/30/40 wt %) were obtained in the same manner as in Example 3. The polyamide particles had a particle diameter $D_{50}$ of 0.57 μm, a melting point of 115° C., and a glass transition temperature of 28° C. An aqueous dispersion (a2) containing a polyamide resin composition was produced therefrom in the same manner as in Example 3.

Subsequently, 11,820 g of water and 5 g of a polyoxyethylene alkyl ether surfactant (polyoxyethylene lauryl ether "Emulgen 103", manufactured by Kao Corp.), a nonionic surfactant which is liquid at 20° C., were added to 300 g of the aqueous polyamide resin dispersion (concentration, 40% by weight) with stirring at room temperature. Thus, a sizing liquid containing polyamide particles dispersed therein (emulsion; surfactant concentration, 0.04% by weight) was obtained.

This sizing liquid was impregnated into an unsized carbon fiber bundle ("Tenax STS-24K N00", manufactured by Toho Tenax Co., Ltd.) to adhere the nylon-6/nylon-11/nylon-12 terpolymer polyamide resin thereto. The fiber bundle obtained was passed through a 150° C. drying oven over 120 seconds to dry the fiber bundle.

Just under the outlet of the dryer, the cross-section of this fiber bundle which was perpendicular to the fiber axis direction had been curled in the shape of the letter C. The degree of curling was evaluated in terms of the angle between the two lines which connected the center of the arc to both ends of the arc. As a result, the angle was 140 degrees. Furthermore, the curled carbon fiber bundle was made flat on a flat plate, and the width of this fiber bundle was measured and was found to be 8 mm.

This fiber bundle was successively subjected to a treatment with a three-roll device. This three-roll device is the same as the device used in Example 12, except that the distance to the second supporting member is longer. Specifically, this three-roll device includes a first supporting member (first roll) and a second supporting member (third roll) which have been disposed at positions apart from the outlet of the drying oven at distances of 10 cm and 30 cm, respectively, therefrom and a pressing member (second roll)

disposed at a position which lies midway between the first supporting member and the second supporting member and which is 2 cm apart downward from the plane that includes both the fiber-bundle sliding contact surface of the first supporting member and the fiber-bundle sliding contact surface of the second supporting member.

The fiber bundle which had come out from the outlet of the dryer was consecutively passed through this three-roll device and then wound up with a winder. The surface temperature of the strand which was passing through the midway pressing member was measured, and was found to be 88° C., which was higher by 60° C. than the glass transition temperature of the resin component of the sizing agent, i.e., 28° C. The carbon fiber bundle passed from the first supporting member to the second supporting member over about 1.2 seconds. The resin-sized reinforcing fiber bundle which had passed through the second supporting member had neither warpage nor folding along the fiber axis direction, and the width of the fiber bundle had increased to 10 mm (1.25 times the width thereof before the contact heating). In the cross-section of the strand, the angle between the two lines connecting the center of the arc to both ends of the arc was 180 degrees. The amount of the adherent resin in the resin-sized reinforcing fiber bundle was 0.51 wt %. Furthermore, the surface and inner surfaces of the resin-sized reinforcing fiber bundle were observed with a fluorescence microscope. As a result, it was found that the resin was adherent in a large amount to the surface of the surface layer of the fiber bundle and the adherent-resin amount decreased toward the inside.

A resin coating (B) having a thickness of 4 nm covered 98% of the surface of the carbon fibers obtained. Furthermore, resin lumps (A) having a thickness of 128 nm, average major-axis length of 1,200 nm, and average minor-axis length of 815 nm were randomly present on the fibers to form a pattern of blotches as in the giraffe. Within a field of view of 900 μm² in an observation with an electron microscope, 103 such resin lumps (A) were observed. Furthermore, resin lumps (C) were simultaneously observed within fine concaves and convexes of the fiber surface; these resin lumps were continuous along the fiber axis direction and had a width of 58 nm and a thickness of 56 nm.

Meanwhile, connecting resin lumps (D) were observed between the carbon fibers constituting the carbon fiber bundle. These resin lumps were continuous along the fiber axis direction and had a length of 10 μm or more and an average thickness of 648 nm. Fifty single fibers were examined and, as a result, such connecting resin lumps (D) were observed at 19 positions.

Next, the resin-sized reinforcing fiber bundle was examined for the degree of opening. As a result, a degree of opening as high as 56% was obtained.

Example 15

Composite Material (Random Mat)

The 10-mm carbon fiber bundle of Example 14, which showed a degree of opening as high as 56%, and a thermoplastic resin (nylon-6 resin powder "A1030FP", manufactured by Unichika, Ltd.) as a matrix resin were prepared, and a random mat (composite material) was obtained in the same manner as in Example 2. This random mat was pressed to obtain a molded plate (composite) of the random-mat composite material, the molded plate having a total fiber-and-resin areal weight of 2,700 g/m², a thickness of 2.0 mm, and a fiber volume fraction of 35 vol %. The composite obtained had no unimpregnated spots, and showed highly excellent flexural properties including a flexural strength of 473 MPa and a flexural modulus of 25 GPa.

Example 16

As in Example 14, use was made of a fiber bundle obtained by adhering the same nylon-6/nylon-11/nylon-12 terpolymer polyamide resin as in Example 3 to an unsized carbon fiber bundle and drying this fiber bundle by passing the fiber bundle through a 150° C. drying oven over 120 seconds.

A resin-sized reinforcing fiber bundle was produced in the same manner as in Example 13, except that the rolls serving as the first supporting member, second supporting member, and pressing member in Example 14 were changed from the fixed-type rod-shaped objects to rotating-type rod-shaped objects. This fiber bundle had little surface fluffing derived from single fibers and had excellent quality. The resin-sized reinforcing fiber bundle which had passed through the second supporting member had neither warpage nor folding along the fiber axis direction, and the width of the fiber bundle had increased to 10 mm (1.25 times the width thereof before the contact heating). In the cross-section of the strand, the angle between the two lines connecting the center of the arc to both ends of the arc was 180 degrees. The amount of the adherent resin in the resin-sized reinforcing fiber bundle obtained was 0.51 wt %. Furthermore, the surface and inner surfaces thereof were observed with a fluorescence microscope. As a result, it was found that the resin was adherent in a large amount to the surface of the surface layer of the fiber bundle and the adherent-resin amount decreased toward the inside.

Next, the fiber bundle obtained was examined for the degree of opening. As a result, a degree of opening as high as 54% was obtained.

Example 17

Composite Material (Random Mat)

A random mat (composite material) was obtained in the same manner as in Example 2, except that the carbon fiber bundle of Example 16 was used. This random mat was pressed to obtain a molded plate (composite) of the random-mat composite material, the molded plate having a total fiber-and-resin areal weight of 2,700 g/m², a thickness of 2.0 mm, and a fiber volume fraction of 35 vol %. The composite obtained had no unimpregnated spots, and showed highly excellent flexural properties including a flexural strength of 474 MPa and a flexural modulus of 24 GPa.

Example 18

An aqueous dispersion (b1) containing a microparticle component was prepared.

Specifically, an aqueous dispersion (b1) (resin concentration, 25 wt %) which was an aqueous nylon emulsion solution containing a polyamide resin having a particle diameter $D_{50}$ of 0.1 μm (particle diameters $D_{10}/D_{50}/D_{90}$=0.07 μm/0.1 μm/0.2 μm) as a microparticle component of a sizing agent was prepared.

The thermoplastic resin particles serving as microparticles were resin particles obtained by introducing a polyamide resin produced from dimer acids (polymerizable fatty acids "Tsunodyme 395", manufactured by Tsuno Food Industrial Co., Ltd.; dimer acid content, 94%), ethylenediamine, azelaic acid, and piperazine as starting materials (the dimer acids accounting for 90% by mole of the whole dicarboxylic acid ingredient) into an emulsifier together with isopropyl alcohol, tetrahydrofuran, triethylamine, toluene, and distilled water, stirring the contents at 130° C. and 400 rpm for 60 minutes, further adding 170 parts by weight of distilled water, and then evacuating the emulsifier while immersing the emulsifier in a hot-water bath heated at 80° C., thereby distilling off a mixed solvent composed of isopropyl alcohol, tetrahydrofuran, toluene, and water. The thermoplastic resin particles were used finally in the form of an aqueous nylon emulsion solution (aqueous dispersion (b1)) (resin concentration, 25 wt %).

The aqueous dispersion (a1) prepared in Example 1, which contained a fine-particle component, was mixed with the aqueous dispersion (b1) containing a microparticle component, thereby obtaining a sizing liquid (emulsion solution of sizing agent).

Specifically, the microparticle component and the fine-particle component were added so that the amounts thereof were 15 parts by weight and 12 parts by weight, respectively, per 1,000 parts by weight of the emulsion, and the mixture was stirred until the particles were dispersed, thereby preparing a sizing liquid (emulsion solution for use as sizing agent) in which the content of all solids including other component(s) was 28 parts by weight (other component(s), 1 part by weight).

While the sizing liquid obtained was kept being stirred in a sizing bath, an unsized carbon fiber strand ("Tenax STS-24K N00, manufactured by Toho Tenax Co., Ltd.; diameter 7 μm×24,000 filaments) was continuously immersed therein. Thus, the emulsion solution for use as sizing agent for carbon fibers was impregnated into interstices among the filaments.

This strand was dried/heat-treated by passing the strand through a 170° C. drying oven over about 120 seconds and then through a 150° C. drying oven over about 120 seconds. Thus, a carbon fiber bundle having a width of about 10 mm was obtained.

The amount of the entire adherent sizing agent in the carbon fiber bundle obtained was 0.95 parts by weight per 100 parts by weight of the carbon fibers. The amount of the microparticle component was 0.50 parts by weight, and that of the fine-particle component was 0.40 parts by weight (other component(s), 0.5 parts by weight). The handle of this carbon fiber bundle was measured and, as a result, was found to be 176. Furthermore, this strand was evaluated for the degree of rounding. As a result, the strand was rated as "○: such a level that the strand has rounded only at the ends but can be wound without arousing any trouble".

Example 19

Composite (Uniaxially Aligned Carbon Fiber Composite)

Subsequently, the carbon fiber bundles obtained in Example 18 were disposed in parallel along one direction while squeezing the bundles with a round rod, thereby arranging the bundles into a sheet form. A polyamide-6 film (a 25 μm-thick film of "EMBLEM", manufactured by Unichika, Ltd.; melting point, 230° C.) was placed on each of the upper and lower surfaces of the sheet so that the amount of the polyamide-6 resin was 100 parts by volume per 100 parts by volume of the carbon fibers. This stack was pressed at a pressure of 2.5 MPa with a 260° C. hot press to obtain a uniaxially aligned carbon-fiber composite material sheet.

The uniaxially aligned carbon-fiber composite material sheet had a carbon-fiber areal weight of 100 g/m². Eighteen sheets which each were the uniaxially aligned carbon-fiber composite material sheet were stacked so as to be aligned in one direction, heated at a pressure of 3.0 MPa for 15 minutes with a pressing device heated at 260° C., and then gradually cooled, thereby obtaining a molded plate (uniaxially aligned carbon fiber composite).

The molded plate thus obtained using carbon fiber bundles had a thickness of 1.73 mm and a fiber volume fraction (Vf) of 49%. Furthermore, the degree of impregnation obtained through an examination by two-dimensional mapping by the ultrasonic flaw detection method (C-scan) was 92.

Example 20

Composite Material (Random Mat)

The carbon fiber bundle obtained in Example 18 was used to produce an isotropic carbon-fiber composite material (random mat). Specifically, carbon fiber bundles obtained by cutting the carbon fiber bundle into a length of 16 mm and a polyamide-6 resin powder (nylon-6 resin powder "A1030FP", manufactured by Unichika, Ltd.; melting point, 230° C.) were introduced into a tapered tube at set feed rates of 450 g/min and 480 g/min, respectively. The carbon fibers were sprayed, together with the polyamide-6 resin powder, on a table disposed under the outlet of the tapered tube. The carbon fibers and polyamide-6 resin powder sprayed were sucked with a blower from under the table and fixed. Thus, a satisfactory carbon-fiber random mat (composite material) which had a thickness of about 5 mm and was in an unshaped stage was obtained.

The carbon-fiber random mat obtained was subjected to a pre-pressing step in which the random mat was heated at 3 MPa for 5 minutes with a pressing device heated at 260° C. Thus, a composite having a fiber areal weight of 2,800 g/m² and a thickness of 1.98 mm was obtained.

This intermediate base material (random-mat carbon fiber composite) produced using the carbon fiber bundle obtained in Example 18 had a fiber volume fraction (Vf) of 42 vol %. The degree of impregnation obtained through an examination by two-dimensional mapping by the ultrasonic flaw detection method (C-scan) was 89. Namely, a satisfactory random-mat carbon fiber composite was obtained.

Furthermore, one sheet of the intermediate base material obtained above was heated to 300° C. and then cold-pressed with a mold with a thickness of 1.6 mm at a mold temperature of 130° C., thereby obtaining a shaped product (composite material). The matrix resin and the fibers for reinforcement had been randomly disposed also in the corner portions of the mold, and a highly even shaped product (composite material) was able to be obtained. No decrease in property due to the cold pressing was observed, and the composite was high also in durability.

Example 21

An aqueous dispersion (b2) containing a microparticle component was prepared.

Specifically, an aqueous resin emulsion (b2) (resin concentration, 20 wt %) which was an aqueous nylon emulsion solution containing a polyamide resin having a particle diameter $D_{50}$ of 0.07 μm (particle diameters $D_{10}/D_{50}/D_{90}$=0.05 μm/0.07 μm/0.09 μm) as a microparticle component of a sizing agent was prepared.

The thermoplastic resin particles serving as microparticles were resin particles obtained by introducing a polyamide resin produced from dimer acids (polymerizable fatty acids "Tsunodyme 395", manufactured by Tsuno Food Industrial Co., Ltd.; dimer acid content, 94%) and ethylenediamine as starting materials (the dimer acids accounting for 100% by mole of the whole dicarboxylic acid ingredient) into an emulsifier together with isopropyl alcohol, tetrahydrofuran, N,N-dimethylethanolamine, and distilled water, stirring the contents at 120° C. and 300 rpm for 60 minutes, further adding 120 parts by weight of distilled water, and then evacuating the emulsifier while immersing the emulsifier in a hot-water bath heated at 80° C., thereby distilling off a mixed solvent composed of isopropyl alcohol, tetrahydrofuran, and water. The thermoplastic resin particles were used finally in the form of an aqueous nylon emulsion solution (aqueous dispersion (b2)) (resin concentration, 20 wt %).

The aqueous dispersion (a1) prepared in Example 1, which contained a fine-particle component, was mixed with the aqueous dispersion (b2) containing a microparticle component, thereby obtaining a sizing liquid.

However, the ratio was changed from that used in Example 18. The microparticle component and the fine-particle component were added so that the amounts thereof were 30 parts by weight and 12 parts by weight, respectively, per 1,000 parts by weight of the emulsion, and the mixture was stirred until the particles were dispersed, thereby preparing a sizing liquid (emulsion solution for use as sizing agent) in which the content of all solids was 43 parts by weight (other component(s), 1 part by weight).

The sizing liquid obtained was used, and in the same manner as in Example 18, a carbon fiber bundle was immersed therein and dried/heat-treated by passing the strand through a 170° C. drying oven over about 120 seconds and then through a 150° C. drying oven over about 120 seconds. Thus, a carbon fiber bundle having a width of about 10 mm was obtained.

The amount of the entire adherent sizing agent in the carbon fiber bundle obtained was 1.45 parts by weight per 100 parts by weight of the carbon fibers. The amount of the microparticle component was 1.0 part by weight, and that of the fine-particle component was 0.41 parts by weight (other component(s), 0.04 parts by weight). The handle of this carbon fiber bundle was measured and, as a result, was found to be 170. Furthermore, this strand was evaluated for the degree of rounding. As a result, the strand was rated as "○: such a level that the strand has rounded only at the ends but can be wound without arousing any trouble".

Example 22

Composite Materials (Uniaxially Aligned Carbon-Fiber Composite Material Sheet and Random Mat)

Subsequently, using the carbon fiber bundle obtained in Example 21, two kinds of composite materials (uniaxially aligned carbon-fiber composite material sheet and random mat) were produced in the same manners as in Examples 19 and 20. Furthermore, the random mat obtained here was cold-pressed in the same manner as in Example 20 to obtain a shaped product (composite). The matrix resin and the fibers for reinforcement had been randomly disposed also in the corner portions of the mold, and a highly even shaped product (composite material) was able to be obtained. No decrease in property due to the cold pressing was observed, and the composite was high also in durability.

The uniaxially aligned carbon fiber composite produced using the obtained carbon fiber bundle had a fiber volume fraction of 49% and a degree of resin impregnation as extremely high as 89%. Meanwhile, the random mat had a fiber volume fraction of 42% and a degree of resin impregnation as extremely high as 86%.

INDUSTRIAL APPLICABILITY

According to the invention, a carbon fiber bundle which shows excellent adhesion to matrix resins and has excellent handleability and carbon fiber products obtained from the carbon fiber bundle are provided. The invention further provides: a carbon fiber bundle which is less apt to suffer the shedding of the sizing agent therefrom in processing steps; and carbon fiber products obtained using the carbon fiber bundle.

While the invention has been described in detail and with reference to specific embodiments thereof, it will be apparent to one skilled in the art that various changes and modifications can be made therein without departing from the spirit and scope thereof.

This application is based on a Japanese patent application filed on Mar. 9, 2012 (Application No. 2012-052912), the contents thereof being incorporated herein by reference.

The invention claimed is:

1. A carbon fiber bundle comprising a sizing agent adherent to a surface of the carbon fiber bundle,
wherein the carbon fiber bundle comprises a plurality of carbon fibers, and
the sizing agent comprises a copolyamide resin, the copolyamide resin containing a repeating unit (A) and at least one repeating unit selected from the group consisting of a repeating unit (B) and a repeating unit (C), and the copolyamide resin having a melting point of 180° C. or lower:

$$-[NH(CH_2)_mCO]- \quad (A)$$

$$-[NH(CH_2)_6NHCO(CH_2)_4CO]- \quad (B)$$

$$-[NH(CH_2)_5CO]- \quad (C)$$

wherein m is an integer of 6 to 20; and
wherein a total concentration of the repeating unit (A) in the copolyamide resin is 30% by weight or more.

2. The carbon fiber bundle according to claim 1,
wherein a total concentration of the repeating unit (A) in the copolyamide resin is 40 to 90% by weight and a total concentration of the repeating unit (B) and the repeating unit (C) in the copolyamide is 10 to 60% by weight.

3. The carbon fiber bundle according to claim 1,
wherein the melting point of the copolyamide resin is 60 to 140° C.

4. The carbon fiber bundle according to claim 1,
wherein the copolyamide resin has a glass transition temperature of −20 to 50° C.

5. The carbon fiber bundle according to claim 1,
wherein the copolyamide has a number-average molecular weight of 1,000 to 50,000.

6. The carbon fiber bundle according to claim 1,
wherein the carbon fibers constituting the carbon fiber bundle has resin lumps of resin constituting the sizing agent present on the surface of the carbon fiber, the resin lumps having a major-axis length less than 10 μm and a thickness of 10 nm or more.

7. The carbon fiber bundle according to claim 1, wherein at least 60% by area of the surface of the carbon fibers constituting the carbon fiber bundle is coated with a resin constituting the sizing agent having a thickness less than 10 nm.

8. The carbon fiber bundle according to claim 1, which is in a form of a tape in which width is larger than thickness.

9. A method of manufacturing a resin-sized carbon fiber bundle comprising applying a sizing liquid to a carbon fiber bundle and drying the carbon fiber bundle, wherein the sizing liquid contains a copolyamide resin, the copolyamide resin comprising a repeating unit (A) and at least one repeating unit selected from the group consisting of a repeating unit (B) and a repeating unit (C), and the copolyamide resin having a melting point of 180° C. or lower:

—[NH(CH$_2$)$_m$CO]—      (A)

—[NH(CH$_2$)$_6$NHCO(CH$_2$)$_4$CO]—      (B)

—[NH(CH$_2$)$_5$CO]—      (C)

wherein m is an integer of 6 to 20; and
wherein a total concentration of the repeating unit (A) in the copolyamide resin is 30% by weight or more.

10. A composite material comprising the carbon fiber bundle according to claim 1 and a matrix resin.

11. The method of manufacturing according to claim 9 wherein a temperature at the drying is a temperature of a melting point or more of the copolyamide resin.

12. The method of manufacturing according to claim 9 wherein an opening treatment is conducted after the drying.

13. The method of manufacturing according to claim 9 wherein the copolyamide resin has a 50%-cumulative particle diameter D$_{50}$ of 0.25 μm or more.

14. The method of manufacturing according to claim 9 wherein the sizing liquid contains particles which have a 50%-cumulative particle diameter D$_{50}$ of less than 0.25 μm.

15. The manufacturing method of carbon fiber bundle according to
wherein a pressing treatment is conducted after the drying.

16. The method of manufacturing according to claim 15 wherein the pressing treatment is conducted with two supporting members and one or more pressing members located between the supporting members, and
a temperature of the carbon fiber bundle during the pressing treatment is a temperature of the glass transition temperature or more of the copolyamide resin.

* * * * *